US011890781B2

(12) United States Patent
Li et al.

(10) Patent No.: US 11,890,781 B2
(45) Date of Patent: Feb. 6, 2024

(54) ALUMINA CERAMIC INTEGRATED HOT PRESS MOLDING MACHINE AND WORKING METHOD THEREOF

(71) Applicants: QINGDAO UNIVERSITY OF TECHNOLOGY, Shandong (CN); SHENYANG HONGYANG PRECISION CERAMICS CO., LTD., Liaoning (CN)

(72) Inventors: Changhe Li, Qingdao (CN); Mingcun Shi, Qingdao (CN); Xiangyang Ma, Qingdao (CN); Yanbin Zhang, Qingdao (CN); Min Yang, Qingdao (CN); Xin Cui, Qingdao (CN); Xiaohong Ma, Qingdao (CN); Teng Gao, Qingdao (CN); Xiaoming Wang, Qingdao (CN); Yali Hou, Qingdao (CN); Han Zhai, Qingdao (CN); Zhen Wang, Qingdao (CN); Bingheng Lu, Qingdao (CN); Huajun Cao, Qingdao (CN); Naiqing Zhang, Qingdao (CN); Qidong Wu, Qingdao (CN)

(73) Assignees: QINGDAO UNIVERSITY OF TECHNOLOGY, Shangdong (CN); SHENYANG HONGYANG PRECISION CERAMICS CO., LTD., Liaoning (CN)

( * ) Notice: Subject to any disclaimer, the term of this patent is extended or adjusted under 35 U.S.C. 154(b) by 302 days.

(21) Appl. No.: 17/280,062

(22) PCT Filed: Feb. 6, 2020

(86) PCT No.: PCT/CN2020/074402

§ 371 (c)(1),
(2) Date: Mar. 25, 2021

(87) PCT Pub. No.: WO2021/128538

PCT Pub. Date: Jul. 1, 2021

(65) Prior Publication Data

US 2022/0111554 A1 Apr. 14, 2022

(30) Foreign Application Priority Data

Dec. 27, 2019 (CN) ......................... 201911380318.6

(51) Int. Cl.
*B28B 3/02* (2006.01)
*B28B 13/02* (2006.01)
*B28B 17/00* (2006.01)

(52) U.S. Cl.
CPC .......... *B28B 3/025* (2013.01); *B28B 13/0235* (2013.01); *B28B 17/0081* (2013.01)

(58) Field of Classification Search
CPC . B28B 3/025; B28B 13/0235; B28B 17/0081; B28B 13/021; B28B 13/0275
See application file for complete search history.

(56) References Cited

FOREIGN PATENT DOCUMENTS

CN 101229656 A 7/2008
CN 105538481 A * 5/2016
(Continued)

OTHER PUBLICATIONS

Sep. 4, 2020 International Search Report issued in International Patent Application No. PCT/CN2020/074402.
(Continued)

*Primary Examiner* — S. Behrooz Ghorishi
(74) *Attorney, Agent, or Firm* — Oliff PLC

(57) ABSTRACT

An alumina ceramic integrated hot press molding machine and working method thereof, including a pressing and hot pressing device fixed accordingly on a rack, a stirring device inside the hot pressing device, and a hot pressing mold above the hot pressing device; the pressing device enables one path of high-pressure air to act on the mold, and enables
(Continued)

the other path to enter the hot pressing device, so the slurry flows into a cavity of the mold; the stirring device stirs the slurry inside the device, so alumina blanks are more evenly distributed therein; and temperature detection components for detecting the temperature of internal oil and the slurry at a slurry outlet are inside the hot pressing device, and the power of an electric heating device is adjusted and controlled in real time according to the temperature detected by the components, to achieve the purpose of accurate temperature control.

8 Claims, 19 Drawing Sheets

(56) References Cited

FOREIGN PATENT DOCUMENTS

| | | | | |
|---|---|---|---|---|
| CN | 105538481 | A | | 5/2016 |
| CN | 205325921 | U | | 6/2016 |
| CN | 205835618 | U | * | 12/2016 |
| CN | 205835618 | U | | 12/2016 |
| CN | 107839133 | A | | 3/2018 |
| ES | 2181514 | B1 | | 6/2004 |

OTHER PUBLICATIONS

Sep. 4, 2020 Written Opinion of the International Searching Authority issued in International Patent Application No. PCT/CN2020/074402.

* cited by examiner

Partial view B
4:1

A–A
A grouting pipe and an electric heater are removed.

B–B
III-1201 and II-1204 are removed.

A rack is removed.

ALUMINA CERAMIC INTEGRATED HOT PRESS MOLDING MACHINE AND WORKING METHOD THEREOF

BACKGROUND

Technical Field

The present disclosure belongs to the technical field of processing and molding of alumina ceramics, and specifically relates to an alumina ceramic integrated hot press molding machine.

Related Art

In ceramic processing, alumina is the most common material. The alumina ceramic is a ceramic material based on alumina ($Al_2O_3$) and is used in thick film integrated circuits. The alumina ceramic has better conductivity, mechanical strength and high temperature resistance. It should be noted that ultrasonic cleaning is required. The alumina ceramic is a kind of ceramics with a wide range of applications. Due to the superior performance, the alumina ceramic has become more and more widely used in the modern society to meet the needs of daily use and special performance.

The alumina ceramic is divided into high-purity type alumina ceramic and common alumina ceramic. The high-purity alumina ceramic is a ceramic material with the $Al_2O_3$ content of 99.9% or more. Because the sintering temperature of the high-purity alumina ceramic is as high as 1,650 to 1,990° C. and the transmission wavelength is 1 to 6 μm, the high-purity alumina ceramic is generally made into molten glass to replace a platinum crucible. Due to the light transmission and resistance to alkali metal corrosion, the high-purity alumina ceramic can be used for a sodium lamp. In the electronic industry, the high-purity alumina ceramic can be used for an integrated circuit substrate and a high-frequency insulating material. The common alumina ceramic can be divided into varieties such as 99 ceramic, 95 ceramic, 90 ceramic, and 85 ceramic according to different $Al_2O_3$ contents. Sometimes, the alumina ceramic with the $Al_2O_3$ content of 80% or 75% also belongs to the common alumina ceramic series. The 99 alumina ceramic material is used to make high-temperature crucibles, refractory furnace pipes and special wear-resistant materials, such as ceramic bearings, ceramic seals and water valves. The 95 alumina ceramic is mainly used for corrosion-resistant and wear-resistant components. The 85 alumina ceramic is often doped with some talc to improve the electrical performance and mechanical strength, and can be sealed with metals such as molybdenum, niobium and tantalum, and some are used for electrical vacuum devices.

The molding methods of alumina ceramic products include dry pressing, grouting, extrusion, cold isostatic pressing, injection, casting, hot pressing, hot isostatic pressing, and the like. In recent years, domestic and foreign molding technology methods such as pressure filtration molding, direct solidification injection molding, gel injection molding, centrifugal grouting molding and solid free molding have been developed. Products with different product shapes, sizes, complex models and precision require different molding methods.

1. Dry-pressing molding: The alumina ceramic dry-pressing molding technology is limited to an object with a simple shape, an inner wall thickness of more than 1 mm, and a length to diameter ratio of not more than 4:1. The molding method adopts uniaxial molding or bidirectional molding. Presses include a hydraulic press and a mechanical press, and can adopt a semi-automatic or fully-automatic molding manner. The maximum pressure of a press is 200 Mpa. The output can reach 15 to 50 pieces per minute. Since the stroke pressure of the hydraulic press is uniform, the height of the pressed part is different when the powder filling is different. The pressure applied by the mechanical press changes with the amount of powder filling, which will easily cause difference in size shrinkage after sintering and affect the product quality. Therefore, uniform distribution of powder particles during dry pressing is very important for mold filling. The accuracy of the filling amount has a great influence on the dimensional accuracy control of the manufactured alumina ceramic parts. The powder particles greater than 60 μm and between 60 meshes and 200 meshes can obtain the maximum free flow effect and the best pressure molding effect.

2. Grouting molding method: Grouting molding is the earliest molding method used for the alumina ceramic. Due to the use of plaster molds, the cost is low, and components with large sizes and complex shapes are easy to mold. The key to grouting molding is the preparation of alumina slurry. Usually, water is used as a flux medium, then a debonding agent and a binder are added, the air is exhausted after full grinding, and then, the product is poured into a plaster mold. Due to the absorption of moisture by the capillary of the plaster mold, the slurry solidifies in the mold. During hollow grouting, when the mold wall absorbs the slurry to the required thickness, the excess slurry needs to be poured out. In order to reduce the blank shrinkage, high-concentration slurry should be used as much as possible.

3. Hot casting molding: Hot casting molding is a relatively extensive production process for producing special ceramics. The basic principle is as follows: by means of the characteristics of paraffin molten by heating and solidified by cooling, non-plastic infertile ceramic powder and hot paraffin liquid are evenly mixed to form flowable slurry, and the slurry is injected into a metal mold under a certain pressure and molded and cooled; after the paraffin slurry is solidified, a molded blank is removed from the mold; the blank is properly trimmed, buried in an adsorbent and heated for paraffin removal; and then, the blank after paraffin removal is sintered to form a final product.

The inventors found that the most widely used traditional hot press molding equipment cannot meet special molding requirements. Due to the unreasonable design of an oil bath box heating device, the internal oil is heated unevenly, and the insulation effect on the slurry is not ideal. In addition, when a machine starts, it often requires a lot of preparation time in advance. The alumina powder in the slurry is unevenly distributed in the liquid paraffin, which often causes defects in the blank after paraffin removal. Because the temperature of the slurry is not easy to control, defects will be caused in the mold and the slurry outlet due to the temperature change.

The application (application number: CN201620655548.4) discloses a ceramic hot casting molding machine, including a hot casting machine body, a workbench, a casting mold and fixed support frames, wherein the workbench is mounted on the hot casting machine body, the casting mold is disposed on the workbench, a casting is disposed in the casting mold, the fixed support frames are disposed on the workbench and on both sides of the casting mold, a pressing device is mounted on the fixed support frames, two ends of the pressing device are connected with first air compression pipes, a storage container is disposed in the hot casting machine body, a feeding pipe is disposed in the storage container, an oil bath thermostat is disposed between the hot casting machine body and the storage container, a U-shaped heating pipe is disposed in the oil bath thermostat, and a second air compression pipe is disposed on one side of the hot casting machine body. In the present utility model, the U-shaped heating pipe is used, so that the slurry in the storage container can be heated evenly; and the pressing device is disposed, so that the pores generated during ceramic molding are reduced, the aesthetics of the ceramic is enhanced, the stability of the ceramic structure is improved, the materials are saved, and the utilization ratio of resources is improved.

This device has the defects that a temperature control device is not provided, so that the molding temperature cannot be controlled accurately, the concentration of the slurry will change, the casting is prone to defects, the temperature field distribution of a heating device is uneven, the temperature rise is slow, the preparation time is long, and the energy consumption is too high, which does not conform to the concept of green processing.

The application (application number: CN201610056298.7) discloses hot casting molding process integrated equipment, including a stirring preparation system, a pressure casting system and a casing. The stirring preparation system includes a stirring tank, a stirring machine and a lifter. A tank body of the stirring tank is divided into an internal layer and an external layer, a cavity is formed between the two layers of the tank body, the cavity is filled with thermally conductive silicone oil, a heater and a temperature sensor are disposed in the cavity, and a discharge hole is also formed at the bottom of the stirring tank. The pressure casting system includes a material liquid pipeline, a discharge port, a bracket and a pressing device. The material liquid pipeline is disposed between the discharge hole and the discharge port, the discharge port is disposed on an upper surface of the casing, the discharge port is also disposed on a central axis of the bracket, the bracket is disposed on the upper surface of the casing, and the pressing device is disposed at the center of a cross beam of the bracket and corresponds to the discharge port. By adopting the equipment of the present invention, the uniform temperature of the material liquid is ensured by means of the oil bath heating of the stirring tank and a heating belt on the material liquid pipeline, and the degree of automation of the equipment is relatively high.

Although this device can accurately control the temperature of the slurry, this device cannot accurately adjust and control the temperature of the slurry according to various forming molds. The stirring device cannot effectively stir the slurry deposited on the bottom, which affects the casting molding quality.

The application (application number: CN201711076088.5) discloses a hot press molding machine, including a handle, a motor case, an upper mold, a lower mold, a bracket, a hydraulic cylinder, a base, a pipeline and a switch box. The switch box is mounted on the left side of the motor case, the lower mold is mounted on the motor case, the bracket is mounted on the motor case, the upper mold is mounted on the bracket, the hydraulic cylinder is mounted on the bracket, the pipeline is connected with the motor case and the hydraulic cylinder, and the base is mounted below the motor case. The invention has the beneficial effects of reasonable design and simple structure. An insulating rubber layer is disposed on the handle, so that the probability of electric shock is greatly reduced, and the safety is improved.

Although this device solves the safety problem, this device has no improvements to the key factor (temperature) that affects hot press molding, and cannot adapt to various forming molds. The temperature field distribution of the heating device is unreasonable, which does not conform to the concept of green processing.

Based on the above factors and in combination with the current concept of green and low-carbon development and the full understanding of the hot casting molding process, the development of related devices is not perfect in structure, the temperature field distribution is generally unreasonable, and the molding temperature cannot be accurately controlled. Furthermore, uneven distribution of alumina powder in liquid paraffin easily causes the defect of poor casting molding quality.

SUMMARY

In order to overcome the defects in the above technologies, the present disclosure provides an alumina ceramic integrated hot press molding machine. The machine integrates five functions of accurate temperature control, stirring, leakage prevention, pressure casting and molding.

The objective of the present disclosure is to provide an alumina ceramic integrated hot press molding machine. In order to realize the above objective, the present disclosure adopts the following technical solution:

An alumina ceramic integrated hot press molding machine includes a pressing device and a hot pressing device which are fixed on a rack, wherein the hot pressing device is located below the pressing device, a stirring device is disposed inside the hot pressing device, and a hot pressing mold is disposed above the hot pressing device;

the pressing device enables one path of high-pressure air to act on the hot pressing mold, and enables the other path of high-pressure air to enter the hot pressing device, so that slurry flows into a cavity of the hot pressing mold;

the stirring device is configured to stir the slurry inside the hot pressing device, so that alumina blanks are more evenly distributed in the slurry; and temperature detection components for detecting a temperature of internal oil and a temperature of slurry at a slurry outlet are respectively disposed inside the hot pressing device, and power of an electric heating device is adjusted and controlled in real time according to the temperatures detected by the temperature detection components, so as to achieve a purpose of accurate temperature control.

As a further technical solution, the pressing device includes threaded connecting rods on both sides of a lifting frame, a piston pressing rod and a return spring disposed in a lifting frame pressing rod stroke cavity, and a flange surface end cover disposed on a lug boss of the lifting frame, the lifting frame is fixed on the threaded connecting rods, a high-pressure air pipe is connected with the flange surface end cover, and high-pressure air is divided into two paths through an air valve and flows out at the same time, wherein one path of air flows to a piston pressing rod stroke cavity on the lifting frame through the high-pressure air pipe, so as to push the piston pressing rod to tightly press the hot pressing mold.

As a further technical solution, a core plate of the hot pressing mold is provided with a core plate positioning column, a core backing plate, an upper mold, a cavity, a lower mold and a slurry inlet plate are positioned and assembled in sequence through the core plate positioning column, and a bottom of the lower mold and an internal junction of a core clamping block and a model cavity have rounded transitions, so that deformation of castings due to stress concentration can be significantly improved.

As a further technical solution, the hot pressing device includes an oil bath box and a flange thimble disposed at an upper part of an oil bath box support lug ring, and a slurry bucket and a slurry outlet end cover are disposed on a lug boss on the inner side of the flange thimble in sequence; and a space between the oil bath box and the slurry bucket is filled with oil, a temperature of the oil is accurately controlled through an electric heating device and a thermocouple disposed inside, a grouting pipe is disposed inside the slurry bucket below the slurry outlet end cover, and an electric heating device and a thermocouple are disposed above the grouting pipe near a position where the slurry outlet is formed, so as to accurately control the temperature of the slurry at the slurry outlet.

As a further technical solution, the stirring device includes an impeller disposed at a bottom of the slurry bucket, a motor on the rack, and a transmission device; and alumina blanks are distributed more evenly in the slurry through the stirring action of the impeller.

As a further technical solution, the piston pressing rod inside the pressing device directly faces the center of the slurry outlet, and a height of the piston pressing rod is adjusted through the interaction of positioning nuts and tightening nuts on the threaded connecting rods, so as to be suitable for molds of different heights.

As a further technical solution, an electric heating device composed of a plurality of U-shaped heating pipes and a temperature thermocouple are disposed inside the oil bath box, and the working power of the electric heating device is adjusted and controlled in real time according to a reading on a temperature control box fed back by the temperature thermocouple.

As a further technical solution, a thermocouple and a slurry outlet electric heating device are disposed on the grouting pipe inside the slurry bucket, and the working power of the slurry outlet electric heating device is adjusted and controlled in real time according to a reading on a temperature box fed back by the thermocouple on the grouting pipe.

As a further technical solution, a space between a transmission shaft of the stirring device and the slurry bucket is filled with a packing material, a gland of the stirring device is located at the bottom of the oil bath box, internal threads are disposed inside the gland, the gland is in threaded connection with a convex head of the slurry bucket, and the gland is in clearance fit with an oil outlet of the oil bath box; as the gland rotates along external threads of the convex head of the slurry bucket, a pressing sleeve tightly presses the packing, and thus, leakage of the slurry is avoided by virtue of a labyrinth effect of the packing material; the gland tightly presses rubber sealing rings located on a slurry bucket base and an oil bath box base at the same time, and thus, leakage of the oil is avoided; and furthermore, the transmission efficiency of the transmission shaft is higher under the cooperation of multiple sets of bearings.

A working method of an alumina ceramic integrated hot press molding machine of the present disclosure includes:

placing an assembled mold in a mold nest at an upper part of a slurry outlet end cover;

stirring slurry in a slurry bucket;

monitoring a temperature of oil inside an oil bath box according to a reading displayed on a temperature control box by a temperature thermocouple inside the oil bath box, and adjusting and controlling heating power of the electric heating device inside the oil bath box; monitoring a temperature of the slurry at a slurry outlet in real time according to a reading of a thermocouple on a grouting pipe; and adjusting and controlling a slurry outlet electric heating device on the grouting pipe in time;

then, turning on an air valve to divide high-pressure air into two paths, wherein one path of air enters a piston pressing rod stroke cavity of a lifting frame to push a piston pressing rod to tightly press the mold, and the other path of air enters the slurry bucket through an air inlet hole on a hand hole end cover; injecting the slurry into a mold cavity through the grouting pipe; because the twists and turns between an air source and the slurry bucket are larger than the twists and turns between the air source and the pressing rod stroke cavity, tightly pressing the mold first by the pressing rod, and then, extruding the slurry by the grouting pipe;

after the mold cavity is filled with the slurry, enabling the air valve to reset under the action of an internal return spring, closing the air valve, enabling the piston pressing rod to reset under the action of the return spring inside the piston pressing rod stroke cavity, and releasing the pressure of the slurry bucket; and taking out the mold, then cutting a grouting port, opening the mold, and taking out a blank.

Beneficial effects of the present invention are as follows:

(1) According to the pressing device of the present disclosure, the height of the piston pressing rod inside the lifting frame can be adjusted and controlled by rotating the positioning nuts and the tightening nuts on the threaded connecting rods, so as to be suitable for molds of different heights; and the piston pressing rod stroke cavity is filled with lubricating oil, so that the friction is reduced, and the air tightness is higher.

(2) According to the hot pressing mold of the present disclosure, by designing a plurality of rounded transitions inside, the defects inside the blank due to stress concentration are avoided; and the blank produced by the mold has a smaller finish allowance so as to meet the requirement of green production.

(3) According to the hot pressing device of the present disclosure, by redesigning the electric heating device inside the oil bath box and adopting a manner of evenly arranging multiple sets of U-shaped electric heating pipes in parallel, the temperature field distribution inside the oil bath box is improved; and compared with a traditional heating device, this device has the advantages that the heating efficiency is higher, the temperature rise is faster, the internal temperature difference of the oil is not large, and the heating effect on the slurry bucket is better.

(4) According to the hot pressing device of the present disclosure, multiple sets of U-shaped heating pipes are connected in parallel, so that the failure rate is lower, and failure of any set of heating pipes will not have a significant impact on the temperature field distribution of the oil bath box.

(5) The temperature thermocouple is disposed inside the oil bath box of the hot pressing device of the present disclosure, which can be used to observe the internal oil temperature in real time, and the power of the electric heating device can be adjusted and controlled in real time through the temperature control box, so as to achieve the purpose of accurate temperature control.

(6) The thermocouple is disposed on the grouting pipe of the hot pressing device of the present disclosure, which can read the temperature of the slurry at the slurry outlet in real time, and the working power of the slurry outlet electric heating device can be adjusted and controlled in real time according to pressure casting process requirements, so as to achieve the purpose of accurate temperature control on the slurry at the slurry outlet.

(7) The stirring device of the present disclosure can avoid the problem of uneven distribution of alumina ingredients inside the slurry bucket, so as to significantly improve the quality of the blank after paraffin removal processing.

(8) According to the stirring device of the present disclosure, there are multiple circles of packing between the transmission shaft and the slurry bucket; as the gland rotates along the external threads of the convex head of the slurry bucket, a pressing sleeve tightly presses the packing, and thus, leakage of the slurry is avoided by virtue of the labyrinth effect of the packing material; the gland tightly presses rubber sealing rings located on a slurry bucket base and an oil bath box base at the same time, and thus, leakage of the oil is avoided; and furthermore, the transmission efficiency of the transmission shaft is higher under the cooperation of multiple sets of bearings.

(9) In the present disclosure, by means of the mold and the heating device, the temperature field distribution tends to be reasonable, the temperature of the slurry can be accurately controlled, the heating efficiency is significantly improved, and the distribution of alumina powder in liquid paraffin can significantly improve the casting molding quality.

(10) In the present disclosure, the temperature thermocouple disposed inside the oil bath box is configured to monitor the temperature of the oil inside the oil bath box in real time, and the working power of the electric heating device is adjusted and controlled in real time according to needs; the thermocouple disposed inside the grouting pipe is configured to monitor the temperature of the slurry at the slurry outlet in real time, and the working power of the slurry outlet electric heating device is adjusted and controlled in real time according to the physical properties of the slurry, so as to realize the function of accurate temperature control; the motor disposed on the rack is configured to drive the impeller disposed at the bottom of a slurry box to rotate by means of pulley transmission, so as to realize a stirring function; by means of the mutual cooperation among the packing disposed at the bottom of the oil bath box, the pressing sleeve and a gland sealing ring, the leakage of the oil and slurry can be prevented, so as to realize an anti-leakage function; and the air valve is turned on by stepping on a pedal, the pressing rod is pressed down under the action of high-pressure air to tightly press the mold, at the same time, the slurry bucket is pressurized, and the slurry is pressed into the mold from the grouting pipe, so as to realize the functions of pressure casting and molding.

BRIEF DESCRIPTION OF THE DRAWINGS

FIG. 2(*a*) is a partially enlarged view of a cross section A in FIG. 2. FIG. 2(*b*) is a cross-sectional view of a connecting part of a lifting frame and a threaded support rod in a cross section B in FIG. 2.

FIG. 4(*a*) is a partially enlarged view of a cross section A in FIG. 4.

FIG. 5(*a*) is a right view of the threaded connecting rod. FIG. 5(*b*) is a front view of the threaded connecting rod.

FIG. 6(*a*) is a top view of the lifting frame. FIG. 6(*b*) is a cross-sectional view of a cross section A-A in FIG. 6(*a*). FIG. 6(*c*) is a partially enlarged view of a cross section B in FIG. 6(*b*).

FIG. 7(*a*) is a front view of the flange surface end cover. FIG. 7(*b*) is a top view of the flange surface end cover. FIG. 7(*c*) is a cross-sectional view of a cross section B-B in FIG. 7(*b*). FIG. 7(*d*) is a partially enlarged view of a cross section C in FIG. 7(*c*).

FIG. 8(*a*) is a front view of the piston pressing rod. FIG. 8(*b*) is a right view of the piston pressing rod.

FIG. 9(*a*) is an exploded view of the clamping nut. FIG. 9(*b*) is a top view of the clamping nut. FIG. 9(*c*) is a cross-sectional view of a cross section A-A in FIG. 9(*b*).

FIG. 10(*a*) is a top view of the positioning nut. FIG. 10(*b*) is a cross-sectional view of a cross section B-B in FIG. 10(*a*).

FIG. 13(*a*) is a cross-sectional view of a cross section A-A in FIG. 13.

FIG. 14(*a*) is an exploded view of the core backing plate. FIG. 14(*b*) is a front view of the core backing plate. FIG. 14(*c*) is a top view of the backing plate.

FIG. 15(*a*) is a front view of the core clamping block. FIG. 15(*b*) is a left view of the core clamping block. FIG. 15(*c*) is a top view of the core clamping block.

FIG. 16(*a*) is a front view of the core post. FIG. 16(*b*) is a left view of the core post. FIG. 16(*c*) is a top view of the core post.

FIG. 17(*a*) is an exploded view of the upper mold. FIG. 17(*b*) is a front view of the upper mold. FIG. 17(*c*) is a top view of an upper mold plate. FIG. 17(*d*) is a partially enlarged view of a cross section B in FIG. 17(*e*). FIG. 17(*e*) is a cross-sectional view of a cross section A-A in FIG. 17(*c*).

FIG. 18(*a*) is a top view of the cavity. FIG. 18(*b*) is a cross-sectional view of a cross section B-B in FIG. 18(*a*). FIG. 18(*c*) is a partially enlarged view of a convex rib in FIG. 18(*a*). FIG. 18(*d*) is a cross-sectional view of a cross section A-A in FIG. 18(*a*).

FIG. 19(*a*) is an exploded view of the lower mold. FIG. 19(*b*) is a top view of the lower mold. FIG. 19(*c*) shows a cross-sectional view of a cross section B-B and a cross section C-C in FIG. 19(*b*). FIG. 19(*d*) is a cross-sectional view of a cross section A-A in FIG. 19(*b*). FIG. 19(*e*) is a top view of an upper backing plate of the lower mold. FIG. 19(*f*) is a top view of a lower backing plate of the lower mold.

FIG. 20(*a*) is a top view of the slurry inlet plate. FIG. 20(*b*) is a cross-sectional view of a cross section A-A in FIG. 20(*a*).

FIG. 21(*a*) is a top view of the hot pressing device. FIG. 21(*b*) is a cross-sectional view of a cross section A-A in FIG. 21(*a*). FIG. 21(*c*) is a cross-sectional view of a cross section B-B in FIG. 21(*a*).

FIG. 24(*a*) is a bottom view of the workbench. FIG. 24(*b*) is a cross-sectional view of a cross section A-A in FIG. 24(*a*). FIG. 24(*c*) is a cross-sectional view of a cross section B-B in FIG. 24(*a*).

FIG. 25(*a*) is a bottom view of the flange thimble. FIG. 25(*b*) is a cross-sectional view of a cross section A-A in FIG. 25(*a*). FIG. 25(*c*) is a cross-sectional view of a cross section B-B in FIG. 25(*a*).

FIG. 26(*a*) is a top view of the machine plate. FIG. 26(*b*) is a left view of the machine plate.

FIG. 27(*a*) is a top view of the mold nest. FIG. 27(*b*) is a cross-sectional view of a cross section A-A in FIG. 27(*a*).

FIG. 28(*a*) is a top view of the slurry outlet end cover. FIG. 28(*b*) is a cross-sectional view of a cross section A-A in FIG. 28(*a*).

FIG. 29(*a*) is a top view of the oil bath box. FIG. 29(*b*) is a cross-sectional view of a cross section A-A in FIG. 29(*a*).

FIG. 30(*a*) is a top view of the hand hole end cover. FIG. 30(*b*) is a cross-sectional view of a cross section A-A in FIG. 30(*a*).

FIG. 31(*a*) is a top view of the electric heating device.

FIG. 32(*a*) is a cross-sectional view of a cross section C-C in FIG. 32. FIG. 32(*b*) is a top view of the slurry bucket.

FIG. 33(*a*) is a partially enlarged view of a cross section A in FIG. 33. FIG. 33(*b*) is a partially enlarged view of a cross section B in FIG. 33.

FIG. 34(*a*) is a partially enlarged view of the stirring device in FIG. 34.

FIG. 35(*a*) is a left view of the rack. FIG. 35(*b*) is a top view of the rack.

In the drawings:

Figure 1:
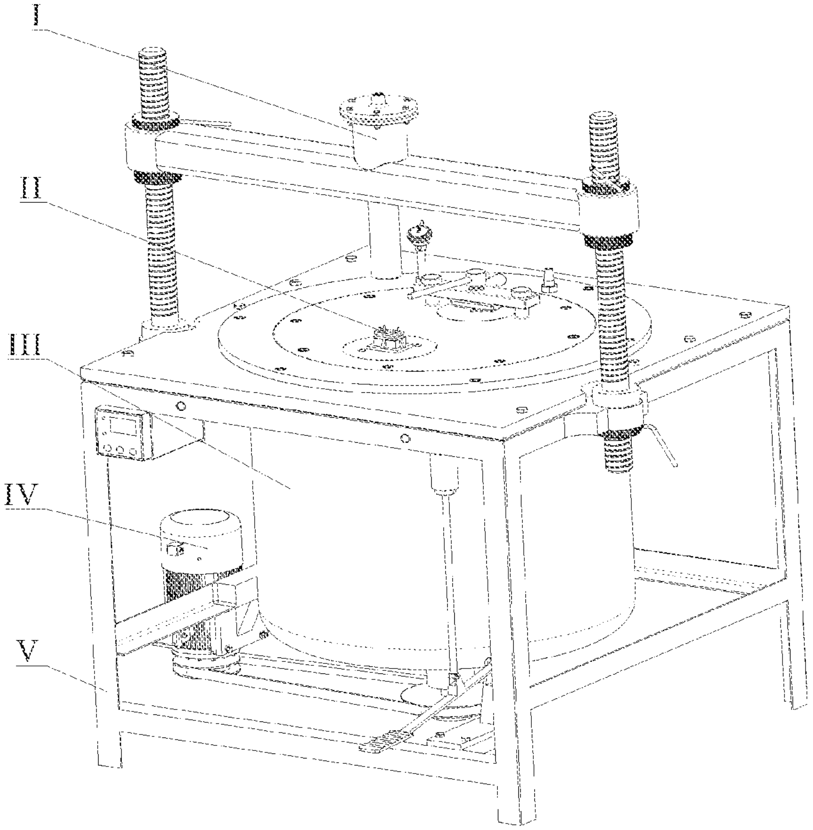
FIG. 1 is an axonometric assembly view of a hot casting machine.

pressing device I, hot pressing mold II, hot pressing device III, stirring device IV, and rack V;

threaded connecting rod I-01, lifting frame I-02, flange surface end cover sealing ring I-03, flange surface end cover I-04, flange surface end cover positioning bolt I-05, flange surface end cover tightening nut I-06, common flat washer I-07, piston pressing rod I-08, clamping nut I-09, positioning nut I-10, and return spring I-11;

core backing plate II-01, upper mold II-02, cavity II-03, lower mold II-04, and slurry inlet plate II-05;

workbench III-01, flange thimble positioning screw III-02, flange thimble III-03, machine plate positioning screw III-04, machine plate III-05, mold nest III-06, slurry outlet end cover III-07, push rod III-08, oil bath box temperature thermocouple III-09, hand hole end cover threaded indenter III-10, oil bath box III-11, hand hole end cover III-12, oil injection joint III-13, hand hole end cover horizontal fastening rod III-14, slurry bucket rubber sealing washer III-15, electric heating device III-16, slurry bucket III-17, and grouting pipe III-18;

impeller IV-01, tapered roller bearing IV-02, slurry bucket base sealing ring IV-03, packing IV-04, oil bath box base sealing ring IV-05, O-shaped sealing ring IV-06, gland IV-07, thrust ball bearing IV-08, transmission shaft IV-09, pressing sleeve IV-10, driving pulley IV-11, and motor IV-12;

motor base V-01, temperature control box nest V-02, threaded support rod base V-03, bolt through hole V-04, and pedal base V-05;

chuck I-0101, lug boss I-0201, positioning round hole I-0202, flange lug boss I-0203, piston pressing rod stroke cavity I-0204, positioning round hole I-0205, pressing rod positioning lug boss I-0206, horizontal connecting rod I-0207, flange surface end cover positioning round hole I-0401, high-pressure air pipe threaded joint I-0402, positioning lug boss I-0403, piston head I-0801, pressing rod I-0802, lubricating oil groove I-0803, round hole nut I-0901, and push rod I-0902;

backing plate II-0101, core backing plate positioning column II-0102, core clamping block II-0103, core post II-0104, upper mold plate II-0201, upper mold positioning column II-0202, cavity positioning round hole II-0301, model cavity II-0302, convex rib II-0303, pin II-0401, lower mold bottom plate II-0402, lower mold plate II-0403, slurry inlet plate positioning round hole II-0501, core positioning hole II-0502, and slurry inlet II-0503;

workbench threaded counterbore III-0101, workbench flange lug boss III-0102, oil bath box positioning groove III-0103, workbench positioning through hole III-0104, half-round notch III-0105, workbench reinforcing rib III-0106, air valve lug boss III-0107, air valve lug boss threaded counterbore III-0108, flange thimble internal lug boss III-0301, flange thimble countersunk through hole III-0302, flange thimble internal threaded counterbore III-0303, slurry bucket positioning groove III-0304, oil injection joint threaded connecting hole III-0305, oil bath box temperature thermocouple threaded connecting hole III-0306, hand hole end cover fastening convex head III-0501, hand hole III-0502, machine plate countersunk through hole III-0503, slurry outlet III-0504, mold nest grouting port III-0601, mold nest side reinforcing rib III-0602, slurry outlet end cover threaded connecting lug boss III-0701, grouting pipe threaded connector III-0702, oil bath box support lug ring III-1101, oil bath box positioning countersunk through hole III-1102, oil bath box lug ring reinforcing rib III-1103, oil outlet III-1104, hand hole end cover air tap joint III-1201, hand hole end cover threaded indenter positioning counterbore III-1202, spoiler plate III-1203, electric heating pipe holder III-1601, electric heating device positioning through hole III-1602, electric heating pipe III-1603, slurry bucket support lug ring III-1701, slurry bucket countersunk through hole III-1702, slurry bucket internal threaded counterbore III-1703, slurry bucket lug ring reinforcing rib III-1704, first grouting pipe III-1801, slurry outlet electric heating device III-1802, thermocouple III-1803, second grouting pipe III-1804, and O-shaped sealing ring III-1805;

core backing plate positioning hole II-010101, core clamping block fixing hole II-010102, core backing plate positioning column fixing hole II-010103, core fixing hole II-010301, upper mold positioning column fixing hole II-020101, core clamping block positioning hole II-020102, upper mold positioning hole II-020103, lower mold bottom plate pin positioning hole II-040201, lower mold bottom plate positioning hole II-040202, transition fillet cavity II-040203, lower mold plate pin positioning hole II-040301, lower mold plate cavity II-040302, and lower mold plate positioning hole II-040303.

DETAILED DESCRIPTION

The present application provides an alumina ceramic integrated hot press molding machine, including five parts: a pressing device, a hot pressing mold, a hot pressing device, a stirring device and a rack. The pressing device and the hot pressing device are fixed on the rack. The stirring device is disposed at the bottom of the hot pressing device. The hot pressing mold is disposed above a discharge port of the hot pressing device.

Embodiment 1

The alumina ceramic integrated hot press molding machine disclosed by the present embodiment is further described below with reference to FIG. 1 to FIG. 35(*b*).

As shown in FIG. 1, an alumina ceramic integrated hot press molding machine is composed of five parts: a pressing device I, a hot pressing mold II, a hot pressing device III, a stirring device IV and a rack V. The pressing device I is located on a threaded support rod base V-03 on the rack V through chucks I-0101 on threaded connecting rods I-01. The pressing device I is fixedly connected to the rack V by rotating clamping nuts I-09. A piston pressing rod I-08 in a piston pressing rod stroke cavity I-0204 of a lifting frame I-02 directly faces the center of a slurry outlet III-0504. The mold II is located in a mold nest III-06 on the hot pressing device III. A slurry inlet II-0503 on a slurry inlet plate II-05 on the mold II is connected with a mold nest grouting port III-0601 in the mold nest III-06. A workbench positioning through hole III-0104 on a workbench III-01 of the hot pressing device III directly faces a bolt through hole V-04 on the rack V. The hot pressing device III is fixedly connected to the rack V by means of bolted connection. A motor IV-11 in the stirring device IV is fixedly connected to a motor support V-01 on the rack V by means of bolted connection. An impeller IV-01 and a transmission shaft IV-09 are fixedly connected to the internal base of a slurry bucket III-17 through a gland IV-08. The motor drives the impeller to rotate through belt transmission.

Figure 2:
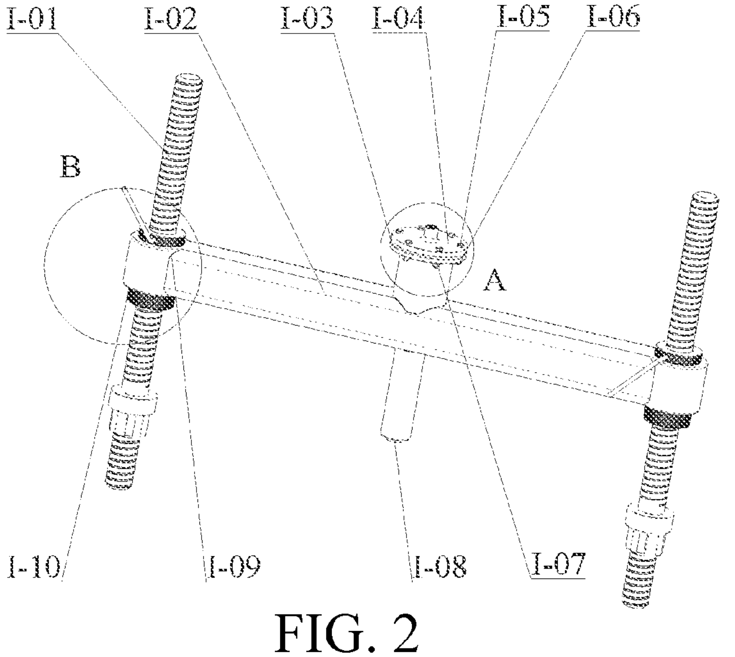
FIG. 2 is an axonometric assembly view of a pressing device.
Figure 2A:
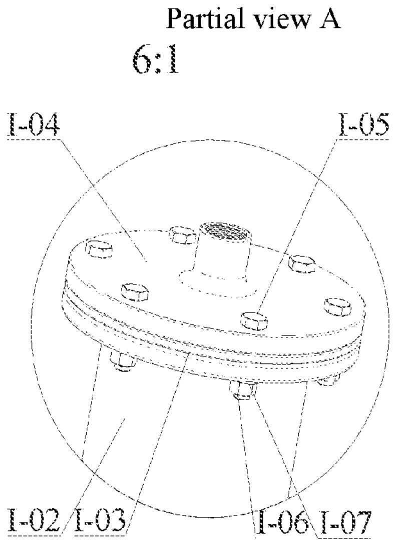
Figure 2B:
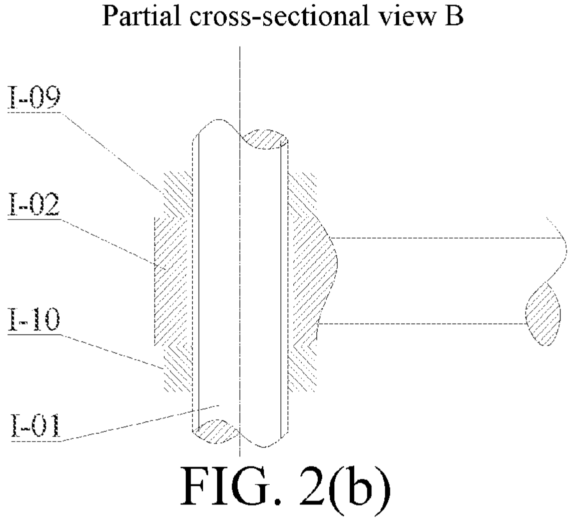
Figure 3:
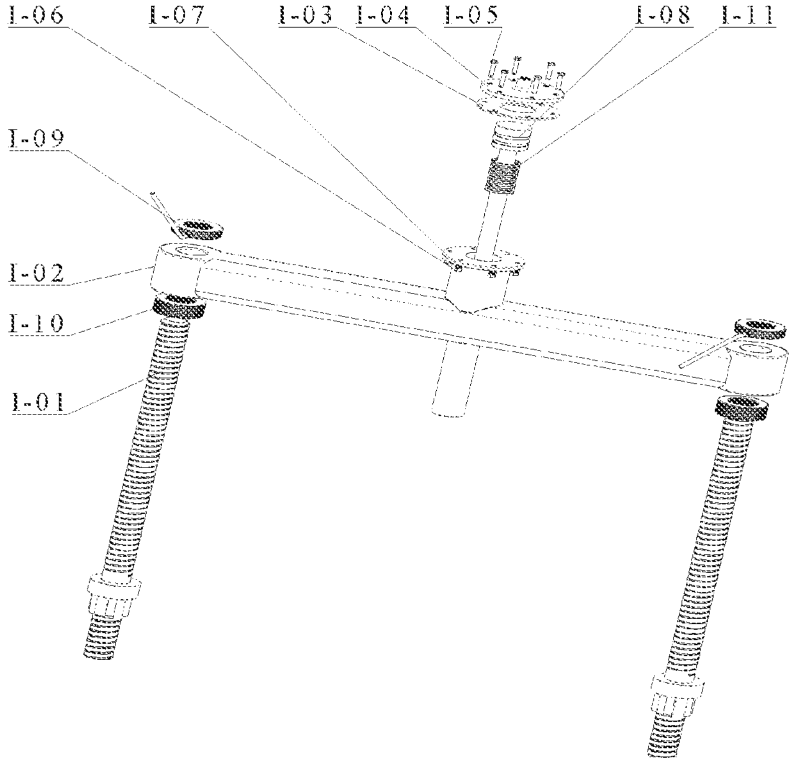
FIG. 3 is an exploded view of the pressing device.
Figure 4:
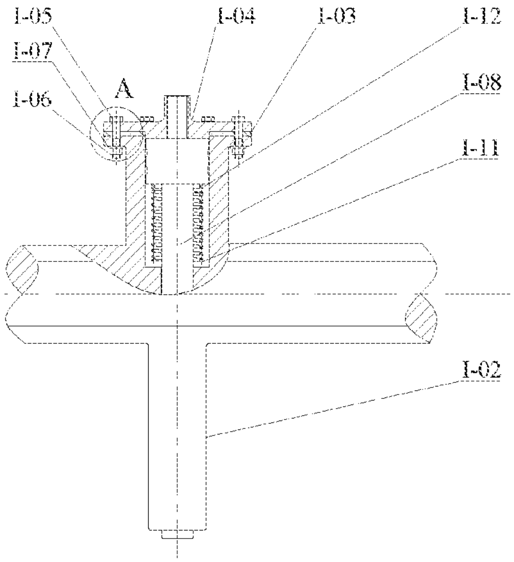
FIG. 4 is a partial cross-sectional view of the pressing device.
Figure 4A:
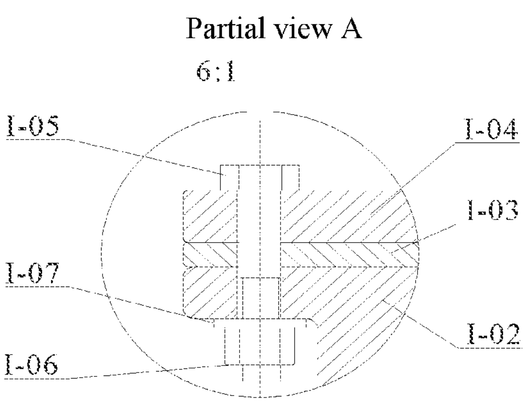

As shown in FIG. 2, FIG. 2(*a*), FIG. 2(*b*) and FIG. 3, the pressing device I is composed of threaded connecting rods I-01, a lifting frame I-02, a flange surface end cover sealing ring I-03, a flange surface end cover I-04, flange surface end cover positioning bolts I-05, flange surface end cover tightening nuts I-06, a common flat washer I-07, a piston pressing rod I-08, clamping nuts I-09, positioning nuts I-10, and a return spring I-11. The piston pressing rod I-08 is located in the piston pressing rod stroke cavity I-0204 inside the lifting frame I-02. The return spring I-11 is disposed below the piston pressing rod I-08. The upper end of an opening of the piston pressing rod stroke cavity I-0204 is provided with the flange surface end cover sealing ring I-03 and the flange surface end cover I-04. The flange surface end cover I-04 is fixedly connected to the lifting frame I-02 through the flange surface end cover tightening nuts I-06, the flange surface end cover positioning bolts I-05 and the common flat washer I-07. The lifting frame I-02 is fixed to the threaded connecting rods through the positioning nuts I-10 and the clamping nuts I-09. The height of the piston pressing rod I-08 inside the lifting frame I-02 relative to the mold II can be adjusted by rotating the positioning nuts I-10. The lifting frame I-02 can be fixed by rotating the clamping nuts I-09. The pressing device has a compact structure and has the advantages of simple structure and low failure rate while meeting the use requirements. When an air valve is stepped on, high-pressure air is divided into two paths to enter the slurry bucket III-17 and the piston pressing rod stroke cavity I-0204 respectively, and the air entering the piston pressing rod stroke cavity I-0204 will take precedence over entering the slurry bucket III-17, so as not to start grouting before the mold II is tightly pressed, thereby avoiding the risk of slurry splashing.

Figure 5:
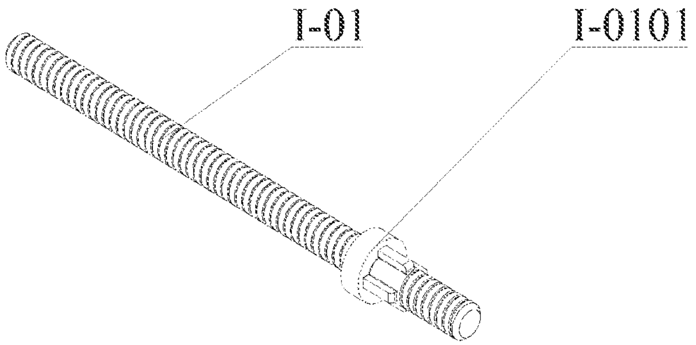
FIG. 5 is an axonometric view of a threaded connecting rod.
Figure 5A:
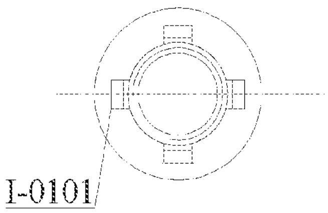
Figure 5B:
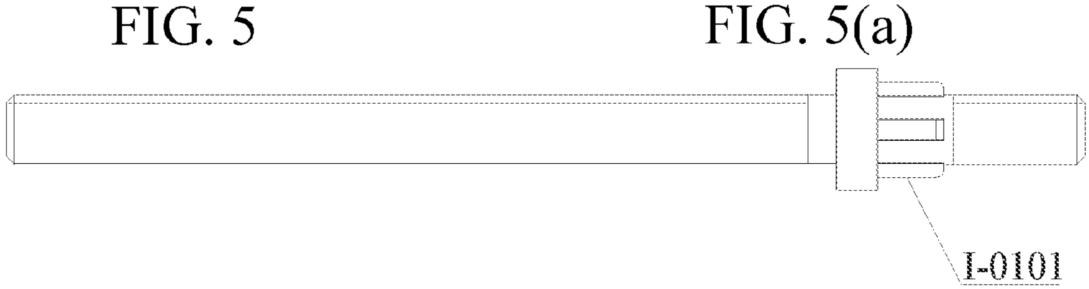

As shown in FIG. 5, FIG. 5(*a*) and FIG. 5(*b*), a chuck I-0101 is disposed at the bottom of a threaded connecting rod I-01. The chuck I-0101 includes a cylindrical base and four convex ribs disposed on one side of the base. The cylindrical base limits the axial movement of the threaded connecting rod I-01. The four convex ribs limit the threaded connecting rod I-01 from rotating in the axial direction. The ridge lines of the four convex ribs have transition fillets having a length of being less than the height of the lug boss of the rack.

Figure 6:
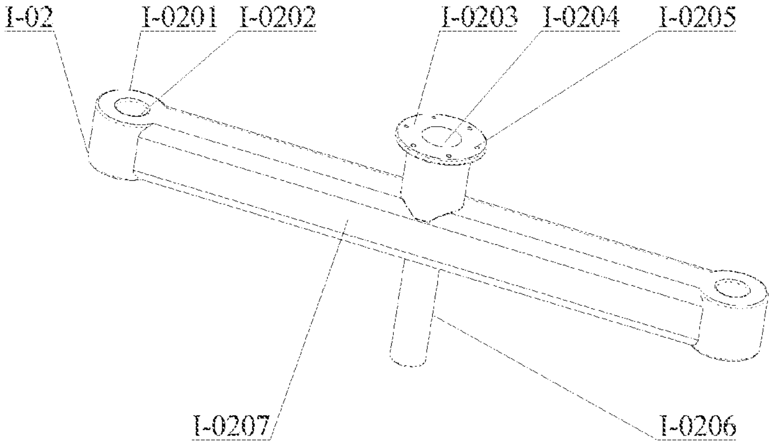
FIG. 6 is an axonometric view of a lifting frame.
Figure 6A:
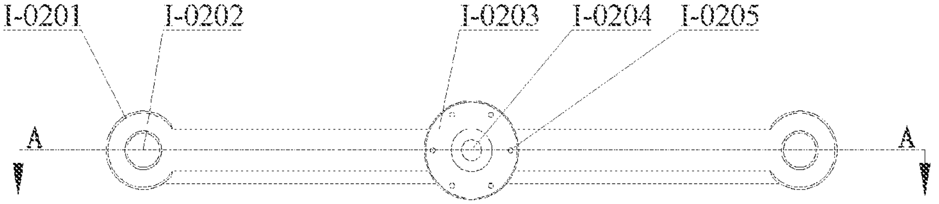
Figure 6B:
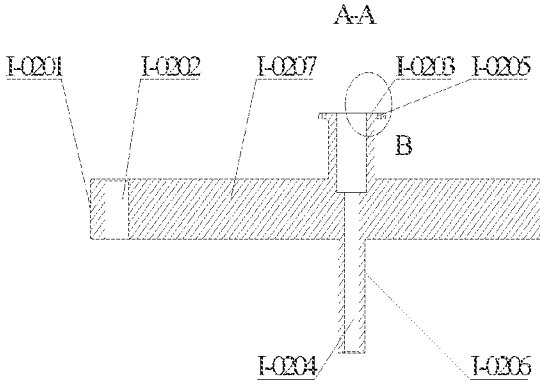
Figure 6C:
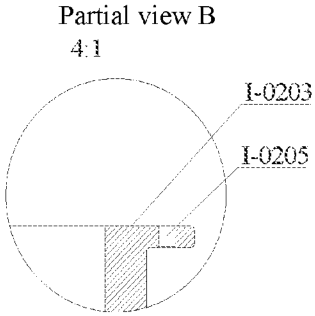

As shown in FIG. 6, FIG. 6(*a*), FIG. 6(*b*) and FIG. 6(*c*), lug bosses I-0201 are respectively disposed on both sides of the lifting frame I-02. The lug bosses I-0201 are provided with positioning round holes I-0202. The lug bosses I-0201 on both sides are connected by a horizontal connecting rod I-0207. A flange lug boss I-0203 is disposed on one side of the middle part of the horizontal connecting rod I-0207, and the axis of the flange lug boss is parallel to the axes of the lug bosses I-0201 on both sides. A flange connecting surface of the flange lug boss I-0203 is evenly provided with six positioning round holes I-0205 in the circumferential direction. A pressing rod positioning lug boss I-0206 is disposed on the other side of the middle part of the horizontal connecting rod I-0207, and the axis of the pressing rod positioning lug boss is collinear with the axis of the flange lug boss I-0203. The piston pressing rod stroke cavity I-0204 is disposed inside the flange lug boss I-0203 and the pressing rod positioning lug boss I-0206 in the axial direction.

Figure 7:
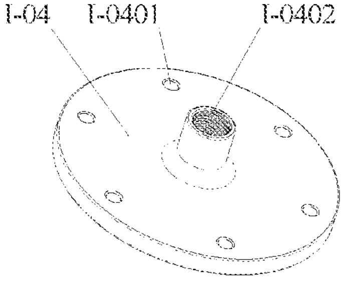
FIG. 7 is an axonometric view of a flange surface end cover.
Figure 7A:
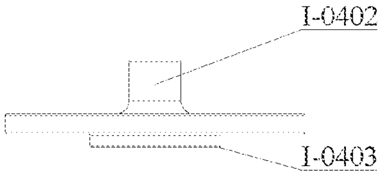
Figure 7B:
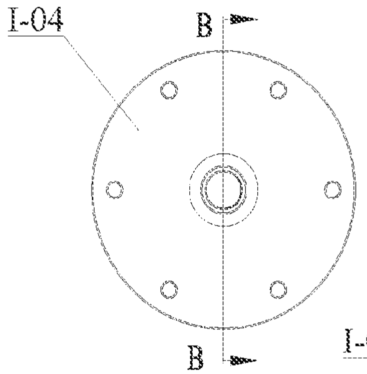
Figure 7C:
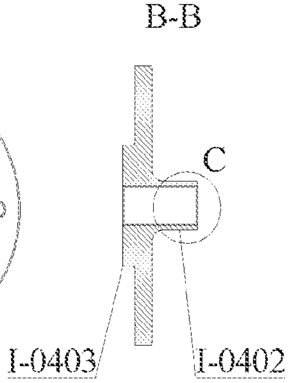
Figure 7D:
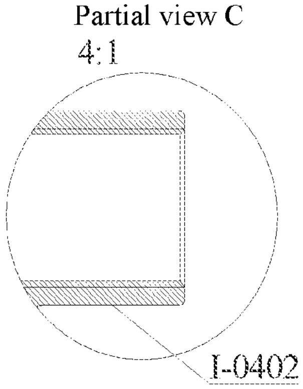

As shown in FIG. 7, FIG. 7(*a*), FIG. 7(*b*), FIG. 7(*c*) and FIG. 7(*d*), the flange surface end cover I-04 is provided with a high-pressure air pipe threaded joint I-0402 on one side in the axial direction. The junction of the high-pressure air pipe threaded joint I-0402 and the flange surface end cover I-04 has a transition fillet, and the other side is provided with a positioning lug boss I-0403. A through hole is formed in the center of a circle of the flange surface end cover I-04 along the axis. Internal threads are disposed inside the through hole. The outer edge of the flange surface end cover I-04 is evenly provided with six flange surface end cover positioning round holes I-0401 in the circumferential direction.

Figure 8A:
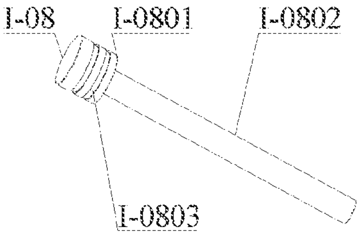
FIG. 8 is an axonometric view of a piston pressing rod.
Figure 8B:
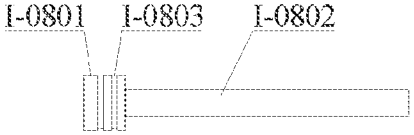
Figure 8:
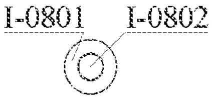

As shown in FIG. 8, FIG. 8(*a*) and FIG. 8(*b*), a piston head I-0801 is disposed at one end of the piston pressing rod I-08, and a pressing rod I-0802 is disposed at the other end of the piston pressing rod. A lubricating oil groove I-0803 is disposed on the circumferential external surface of the piston head I-0801, and lubricating oil plays a role in sealing.

Figure 9:
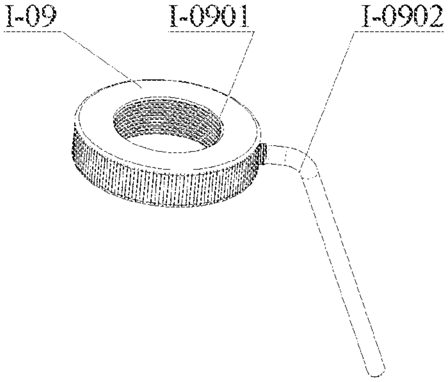
FIG. 9 is an axonometric view of a clamping nut.
Figure 9A:
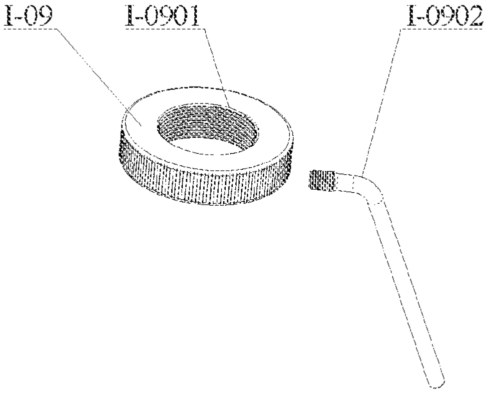
Figure 9B:
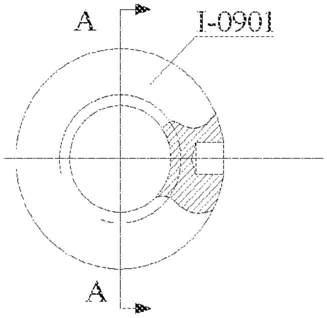
Figure 9C:
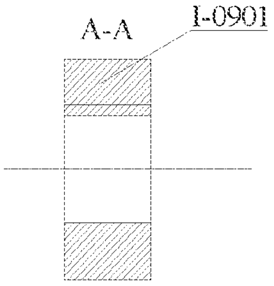

As shown in FIG. 9, FIG. 9(*a*), FIG. 9(*b*) and FIG. 9(*c*), the clamping nut I-09 is composed of a round hole nut I-0901 and a push rod I-0902. The external surface of the round hole nut I-0901 is provided with a counterbore in the radial direction, the surface of the counterbore is engraved with anti-skid knurl, and an internal through hole is engraved with internal threads. The push rod I-0902 is fixedly connected with the counterbore on the round hole nut I-0901 by means of welding.

Figure 10:
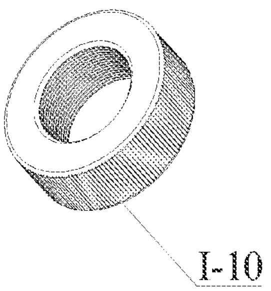
FIG. 10 is an axonometric view of a positioning nut.
Figure 10A:
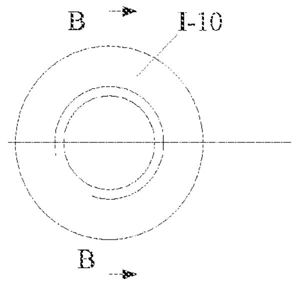
Figure 10B:
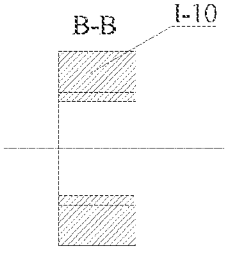

As shown in FIG. 10, FIG. 10(*a*) and FIG. 10(*b*), the external surface of the positioning nut I-10 is engraved with anti-skid knurl, an internal through hole is engraved with internal threads, and the main function is to change the height of the piston pressing rod I-08 in the lifting frame I-02 relative to the mold by means of rotation.

Figure 11:
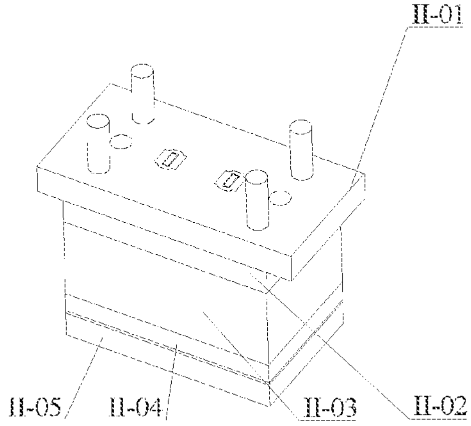
FIG. 11 is an axonometric view of a hot pressing mold.
Figure 12:
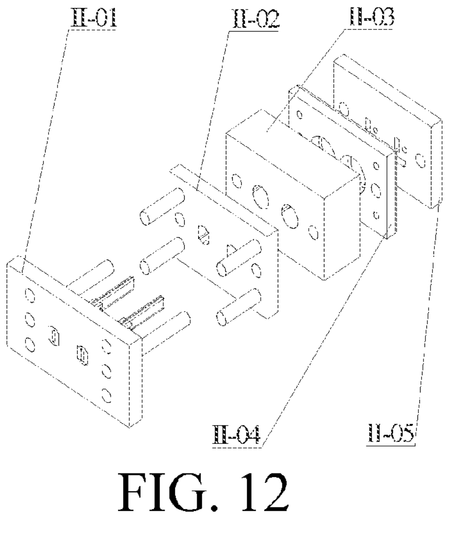
FIG. 12 is an exploded view of the hot pressing mold.
Figure 13:
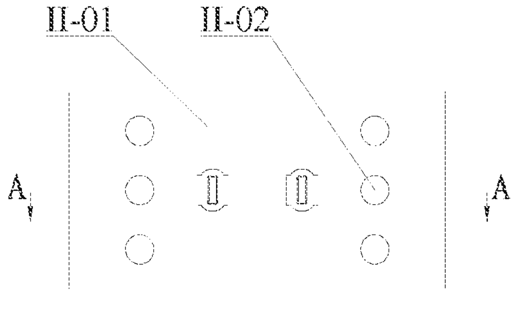
FIG. 13 is a top view of the hot pressing mold.
Figure 13A:
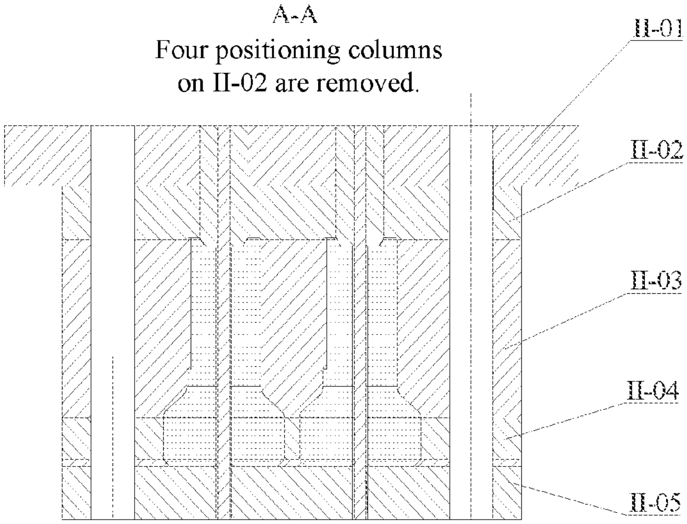

As shown in FIG. 11, FIG. 12, FIG. 13 and FIG. 13(*a*), the hot pressing mold II is composed of five parts: a core backing plate II-01, an upper mold II-02, a cavity II-03, a lower mold II-04, and a slurry inlet plate II-05. A core backing plate positioning column II-0102 on the core backing plate II-01 separately passes through an upper mold positioning hole II-020103 in the upper mold II-02, a cavity positioning round hole II-0301 on the cavity II-03, a lower mold bottom plate positioning hole II-040202 and a lower mold plate positioning hole II-040303 on the lower mold II-04, and a slurry inlet plate positioning round hole II-0501 on the slurry inlet plate II-05. A core clamping block II-0103 separately passes through a core clamping block positioning hole II-020102 on the upper mold II-02, the bottom end of a core post II-0104 passes through a core positioning hole II-0502 on the slurry inlet plate II-05 so as to determine the position of the core in the cavity. An upper mold positioning column II-0202 on the upper mold II-02 separately passes through four sets of core backing plate positioning holes II-010101 on the core backing plate II-01. The hot pressing mold II is simple in structure, convenient to operate, free of other tools during mold disassembly and mold assembly, and convenient to improve the production efficiency.

Figure 14:
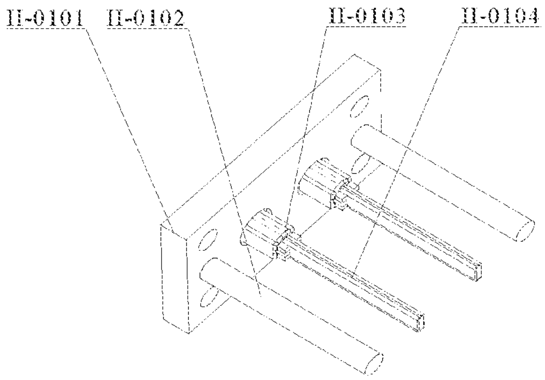
FIG. 14 is an axonometric view of a core backing plate.
Figure 14A:
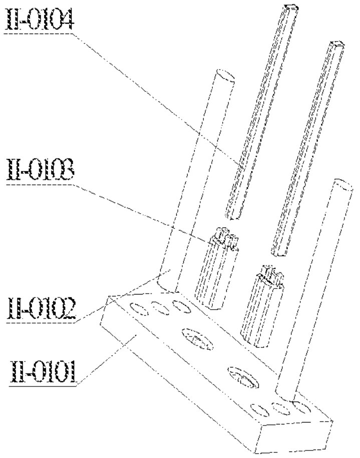
Figure 14B:
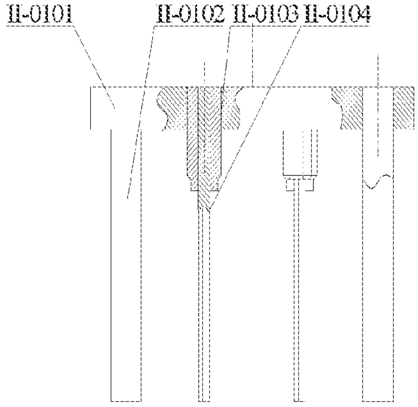
Figure 14C:
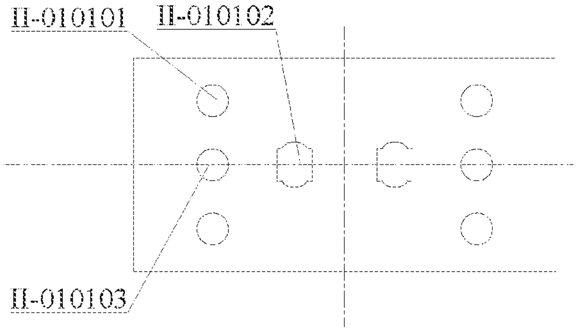
Figure 15:
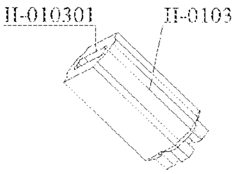
FIG. 15 is an axonometric view of a core clamping block.
Figure 15A:
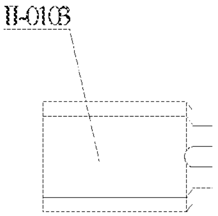
Figure 15B:
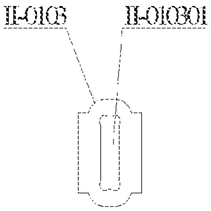
Figure 15C:
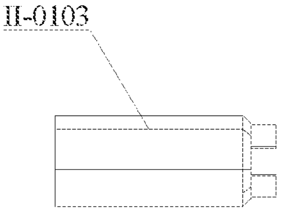
Figure 16:
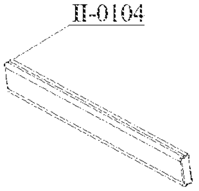
FIG. 16 is an axonometric view of a core post.
Figure 16A:
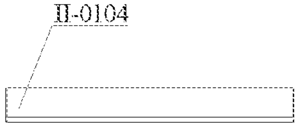
Figure 16B:
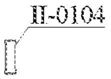
Figure 16C:
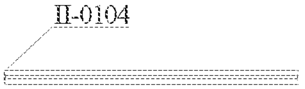

As shown in FIG. 14, FIG. 14(*a*), FIG. 14(*b*), FIG. 14(*c*), FIG. 15, FIG. 15(*a*), FIG. 15(*b*), FIG. 15(*c*), FIG. 16, FIG. 16(*a*), FIG. 16(*b*) and FIG. 16(*c*), the core backing plate II-01 is composed of four parts: a backing plate II-0101, core backing plate positioning columns II-0102, core clamping blocks II-0103 and core posts II-0104. The backing plate II-0101 is provided with four core backing plate positioning holes II-010101 along horizontal and longitudinal symmetrical surfaces respectively, and is provided with two core clamping block fixing holes II-010102 and two core backing plate positioning column fixing holes II-010103 along longitudinal symmetrical surfaces respectively. The core clamping block II-0103 is provided with a core fixing hole II-010301, four lug bosses are disposed at one end of the core clamping block, there are chamfer transitions between the lug bosses and the main body of the core clamping block II-0103, and four long edges of the core post II-0104 have rounded transitions, so as to facilitate mold removal and prevent the inner cavity of the casting from collapsing and deforming due to stress concentration. The core clamping block II-0103 is in interference connection with a core clamping block fixing hole II-010102 on the backing plate II-0101. The core post II-0104 is in interference connection with a core fixing hole II-010301 on the core clamping block II-0103. The core backing plate positioning column II-0102 is in interference connection with a core backing plate positioning column fixing hole II-010103 on the backing plate II-0101.

Figure 17:
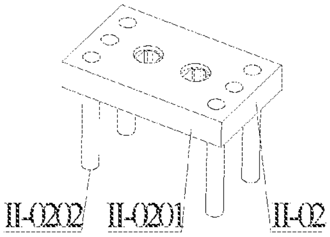
FIG. 17 is an axonometric view of an upper mold.
Figure 17A:
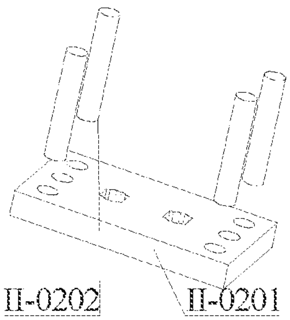
Figure 17B:
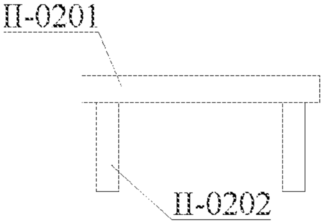
Figure 17C:
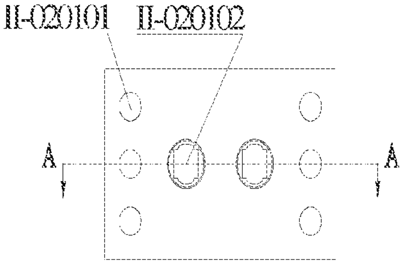
Figure 17D:
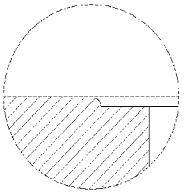
Figure 17E:
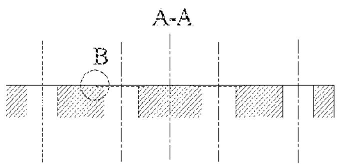

As shown in FIG. 17, FIG. 17(*a*), FIG. 17(*b*), FIG. 17(*c*) and FIG. 17(*e*), the upper mold II-02 is composed of an upper mold plate II-0201 and upper mold positioning columns II-0202. The upper mold plate II-0201 is provided with four upper mold positioning column fixing holes II-020101 along horizontal and longitudinal symmetrical surfaces respectively, and is symmetrically provided with core clamping block positioning holes II-020102 and upper mold positioning holes II-020103 along longitudinal symmetrical surfaces. The upper sides of the core clamping block positioning holes II-020102 are provided with round counterbores, and the lower sides of the core clamping block positioning holes are provided with flower-shaped through holes. The upper mold positioning columns II-0202 are fixedly connected with four upper mold positioning column fixing holes II-020101 on the upper mold plate II-0201.

Figure 18:
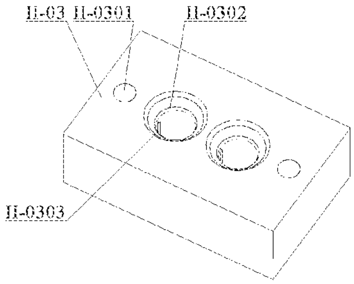
FIG. 18 is an axonometric view of a cavity.
Figure 18A:
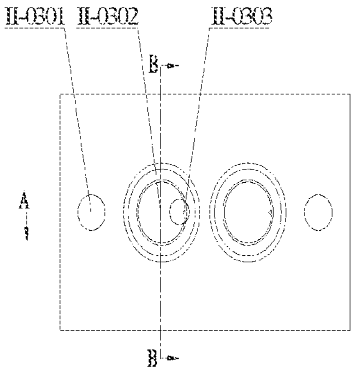
Figure 18B:
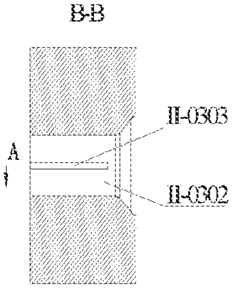
Figure 18C:
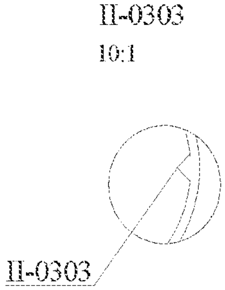
Figure 18D:
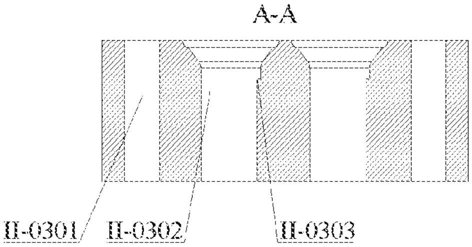

As shown in FIG. 18, FIG. 18(*a*), FIG. 18(*b*), FIG. 18(*c*) and FIG. 18(*d*), the cavity II-03 is provided with cavity positioning round holes II-0301 and model cavities II-0302 along longitudinal symmetrical surfaces respectively. The upper sides of the model cavities II-0302 have transition fillets convenient for mold removal, and convex ribs II-0303 are disposed in cylindrical cavities.

Figure 19:
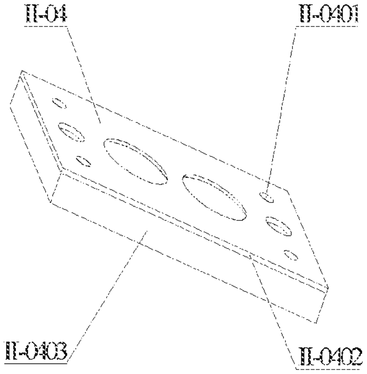
FIG. 19 is an axonometric view of a lower mold.
Figure 19A:
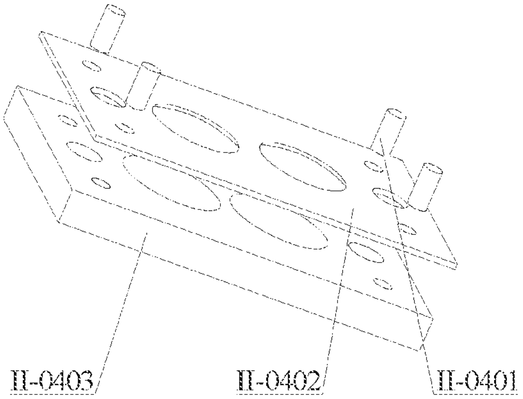
Figure 19B:
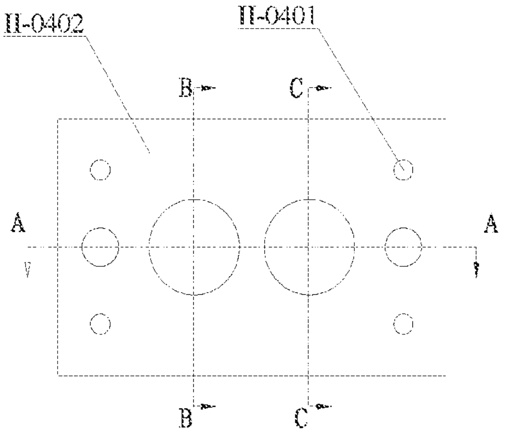
Figure 19C:
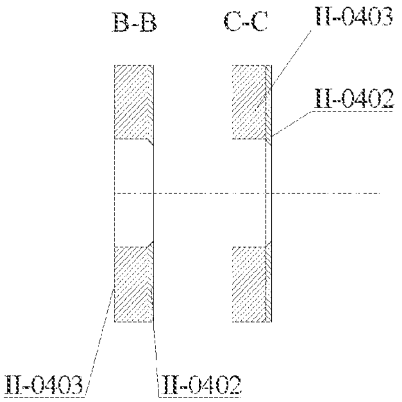
Figure 19D:
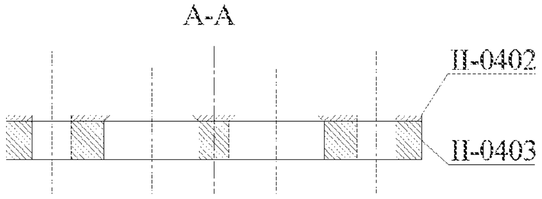
Figure 19E:
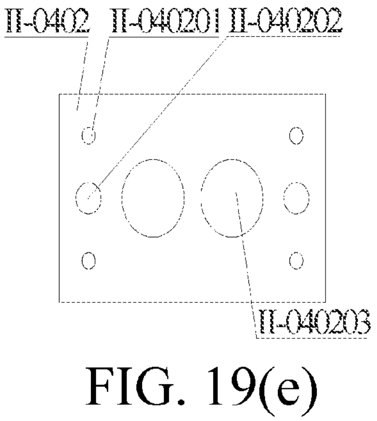
Figure 19F:
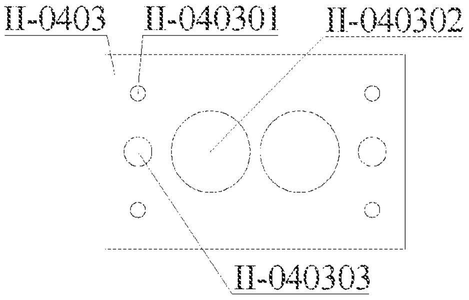

As shown in FIG. 19, FIG. 19(*a*), FIG. 19(*b*), FIG. 19(*c*), FIG. 19(*d*), FIG. 19(*e*) and FIG. 19(*f*), the lower mold II-04 is composed of pins II-0401, a lower mold bottom plate II-0402, and a lower mold plate II-0403. The lower mold bottom plate II-0402 is provided with four sets of lower mold bottom plate pin positioning holes II-040201 along longitudinal and horizontal symmetrical surfaces respectively, and is provided with two sets of lower mold bottom plate positioning holes II-040202 and transition fillet cavities II-040203 along longitudinal symmetrical surfaces respectively. The transition fillet cavities II-040203 are designed to facilitate mold removal and alleviate the stress concentration of the casting. The lower mold plate II-0403 is symmetrically provided with four sets of lower mold plate pin positioning holes II-040301 along longitudinal and horizontal symmetrical surfaces respectively, and is symmetrically provided with two sets of lower mold plate cavities II-040302 and lower mold plate positioning holes II-040303 along longitudinal symmetrical surfaces respectively. The lower mold bottom plate II-0402 is fixedly connected with the lower mold plate II-0403 through pins II-0401 passing through the four sets of lower mold bottom plate pin positioning holes II-040201 and the lower mold plate pin positioning holes II-040301.

Figure 20:
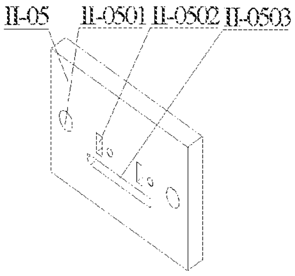
FIG. 20 is an axonometric view of a slurry inlet plate.
Figure 20A:
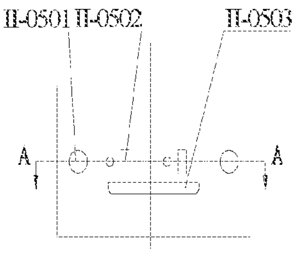
Figure 20B:
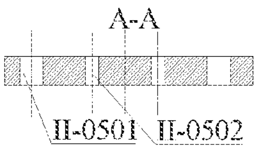

As shown in FIG. 20, FIG. 20(*a*) and FIG. 20(*b*), the slurry inlet plate II-05 is symmetrically provided with slurry inlet plate positioning round holes II-0501 and core positioning holes II-0502 along longitudinal symmetrical surfaces respectively. A slurry inlet II-0503 is disposed below the horizontal symmetrical surfaces of the slurry inlet plate II-05. The slurry inlet II-0502 is communicated with two cavities of the mold separately.

A raw blank obtained by hot casting molding needs to be calcined to obtain a product. There is shrinkage during dry burning, and there is still a certain finish allowance for processing, so the size of a mold needs to be larger than the size required by the product. Assuming that the measured size of the raw blank in a certain direction is a, the size of the calcined product is b, the finish allowance is Δ (when no processing is required, Δ=0), and the shrinkage rate is represented by ε, wherein the calculation formula of the shrinkage rate is:

$$\text{Shrinkage rate } \varepsilon = \frac{\text{Size of raw blank } a - \text{Measured size after calcination } b}{\text{Size of raw blank } a} 100\% \tag{1}$$

$$a = \frac{b + \Delta}{1 - \varepsilon} \tag{2}$$

In addition, the definition of the shrinkage rate also includes:

$$\text{Shrinkage rate } \varepsilon = \frac{\text{Size of raw blank } a - \text{Measured size after calcination } b}{\text{Actual size } b} 100\% \tag{3}$$

Figure 21:
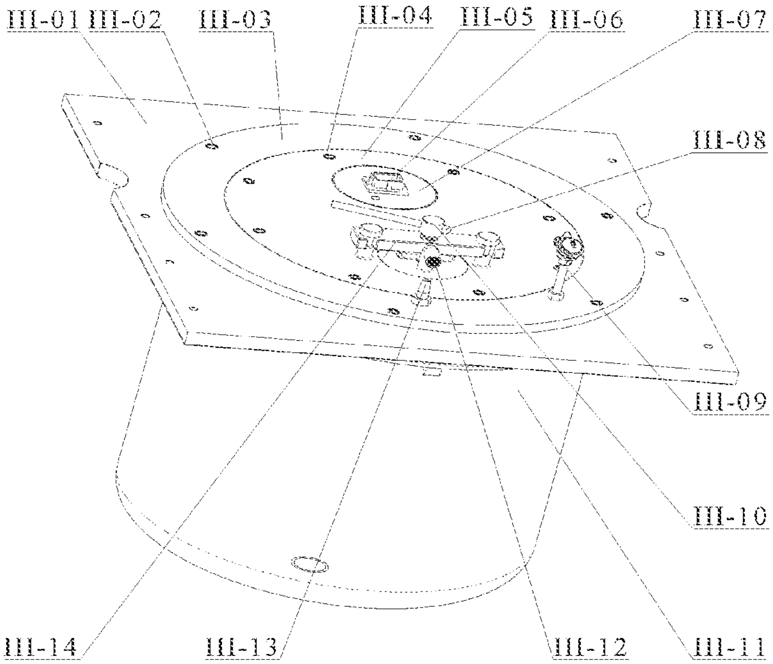
FIG. 21 is an axonometric view of a hot pressing device.
Figure 21A:
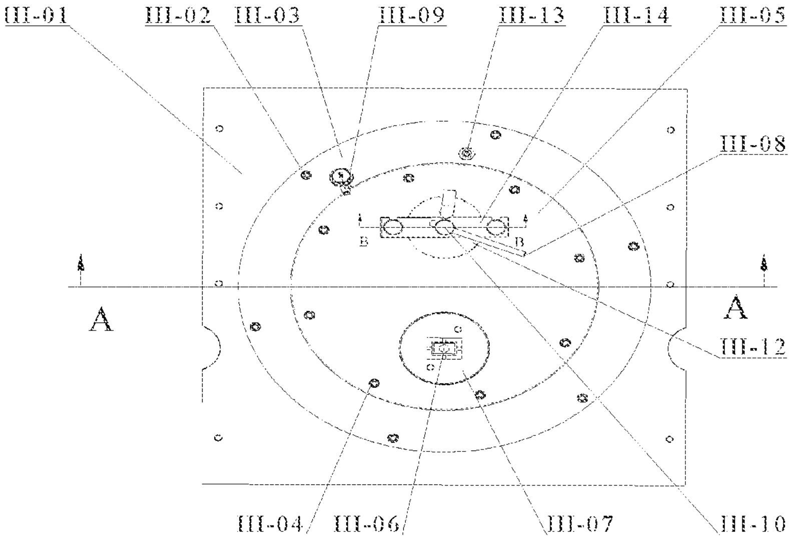
Figure 21B:
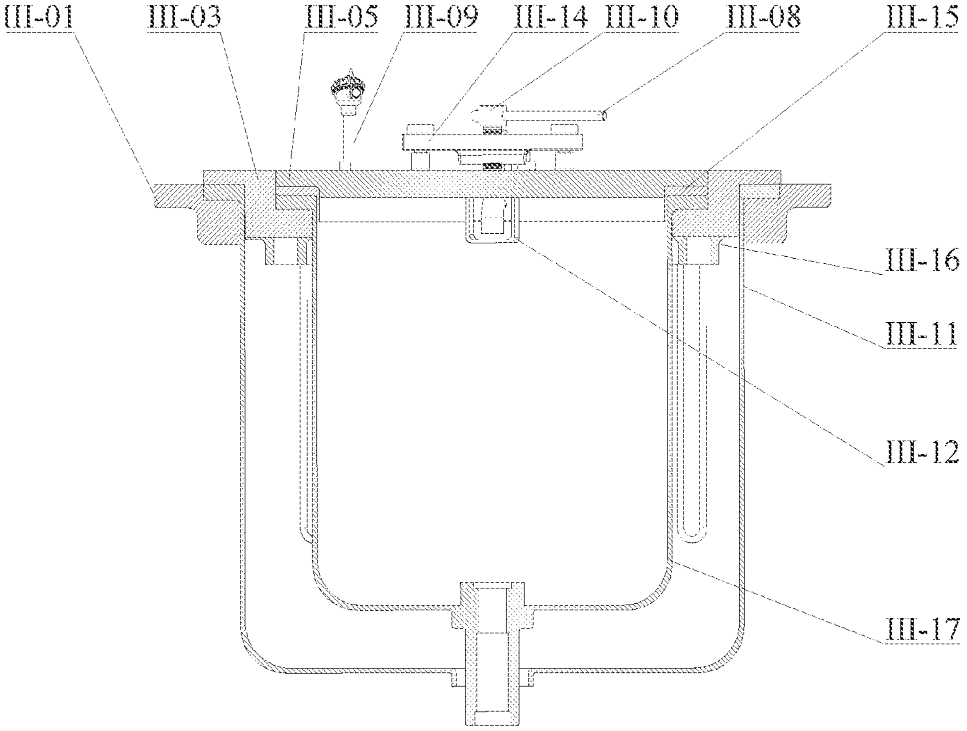
Figure 21C:
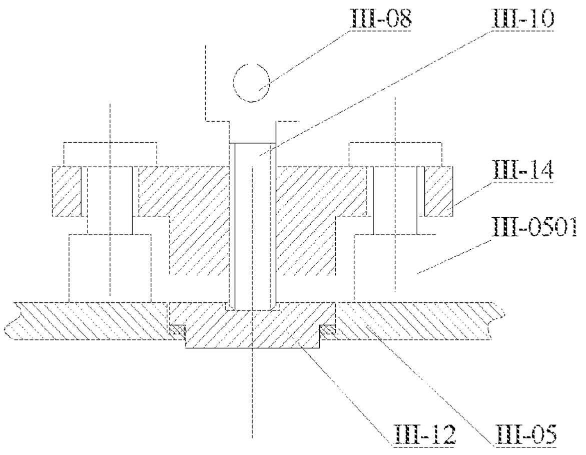
Figure 22:
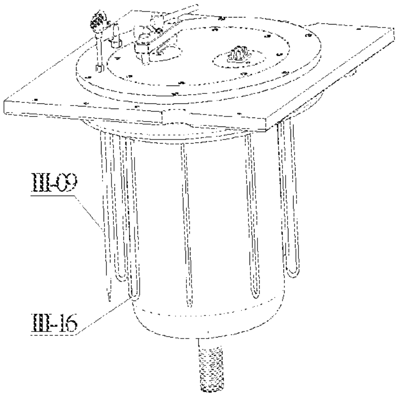
FIG. 22 is an axonometric view of FIG. 21 after an oil bath box is removed.
Figure 23:
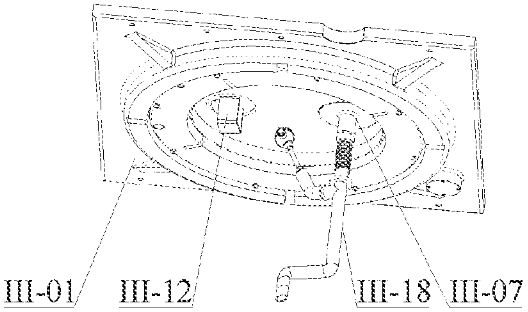
FIG. 23 is an axonometric view of FIG. 21 after the oil bath box, an electric heating device and a slurry bucket are removed.

As shown in FIG. 21, FIG. 21(*a*), FIG. 21(*b*), FIG. 21(*c*), FIG. 22 and FIG. 23, an oil bath box III-11 of the hot pressing device is fixedly connected to the workbench III-01 through hexagon socket head cap screws. The upper part of an opening of the oil bath box III-11 is provided with a flange thimble III-03 which is fixedly connected to the workbench III-01 through flange thimble positioning screws III-02. The lower part of the flange thimble III-03 is provided with an electric heating device III-16 which is fixedly connected to the flange thimble III-03 through internal hexagonal pan head screws. An oil bath box temperature thermocouple III-09 is fixedly connected to the flange thimble III-03 by means of threaded connection, and an oil injection joint III-13 is also fixedly connected to the flange thimble III-03 by means of threaded connection. The upper part of the flange thimble III-03 is provided with a slurry bucket III-17 which is fixedly connected to the flange thimble III-03 through hexagon socket head cap screws. The upper part of the slurry bucket III-17 is sequentially provided with a flange sealing rubber ring and a machine plate III-05 which are fixedly connected to the slurry bucket III-17 through hexagon socket head cap screws. The upper part of the slurry outlet of the machine plate III-05 is sequentially provided with a rubber sealing ring and a slurry outlet end cover III-07, and the slurry outlet end cover III-07 is in threaded connection with the machine plate III-05. The upper part of a hand hole of the machine plate III-05 is sequentially provided with a rubber sealing ring and a hand hole end cover III-12. A hand hole end cover threaded indenter III-10 is in threaded connection with a hand hole end cover horizontal fastener III-14. By rotating a push rod III-08, the hand hole end cover threaded indenter III-10 is driven to rotate, at the same time, the hand hole end cover horizontal fastener III-14 moves upward and is attached to a hand hole end cover fastening convex head III-0501, and simultaneously, the lower end of the hand hole end cover threaded indenter III-10 is in contact with a hand hole end cover threaded indenter positioning counterbore III-1202 on the hand hole end cover III-12, so that the hand hole is in a sealed state. A grouting pipe III-18 is disposed below the slurry outlet end cover III-07 and is connected with the slurry outlet end cover III-07 by means of threaded connection. A space between the oil bath box III-11 and the slurry bucket III-17 is filled with mineral oil or vegetable oil. Oil bath is a hot bath method that uses oil as a hot bath material, and the temperature is generally between 100° C. and 250° C. Due to larger specific heat capacity of the oil, compared with other materials, the temperature rise is fast, the heat dissipation is slow, and the heating effect on slurry is better.

Figure 24:
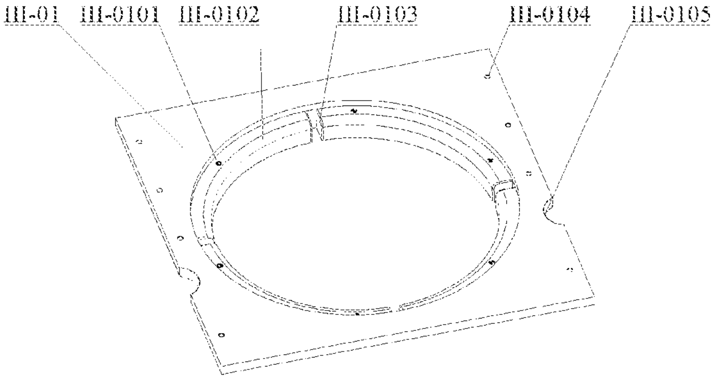
FIG. 24 is an axonometric view of a workbench.
Figure 24C:
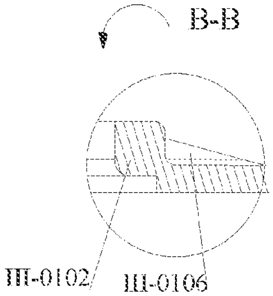
Figure 24A:
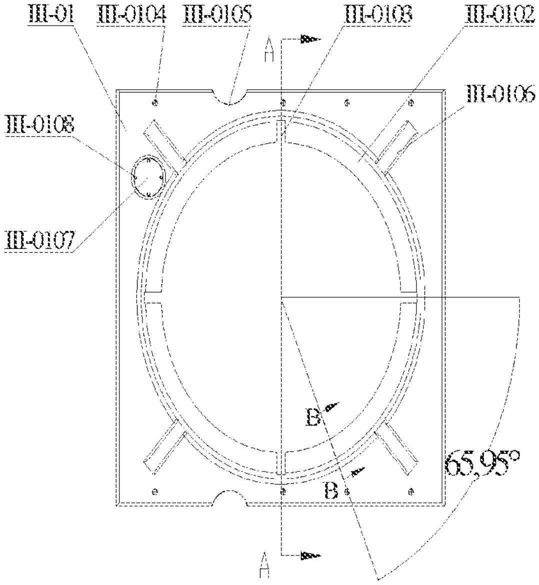
Figure 24B:
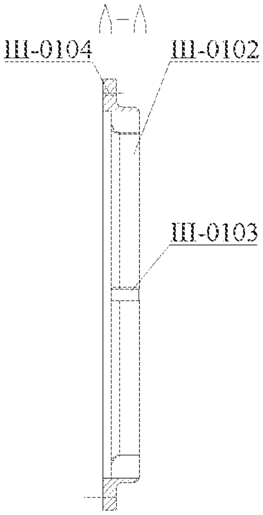

As shown in FIG. 24, FIG. 24(*a*), FIG. 24(*b*) and FIG. 24(*c*), the inner side of the workbench III-01 is provided with a workbench flange lug boss III-0102 in the circumferential direction. Oil bath box positioning grooves III-0103 are symmetrically disposed in longitudinal and horizontal symmetrical surfaces of the workbench flange lug boss III-0102. The upper surface of the workbench flange lug boss is evenly provided with six workbench threaded counterbores III-0101 in the circumferential direction. The junction of the lower surface of the workbench III-01 and the workbench flange lug boss III-0102 is provided with four workbench reinforcing ribs III-0106 along the diagonals of the workbench respectively. The outer edges of the workbench III-01 are symmetrically provided with four sets of workbench positioning through holes III-0104 and a set of half-round notches III-0105. The upper left corner of the workbench III-01 is provided with an air valve lug boss III-0107 which is evenly provided with four air valve lug boss threaded counterbores III-0108 in the circumferential direction.

Figure 25:
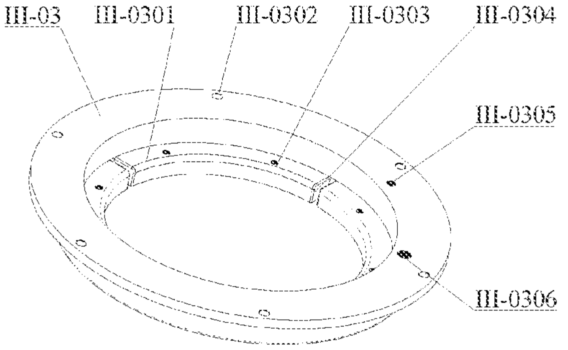
FIG. 25 is an axonometric view of a flange thimble.
Figure 25C:
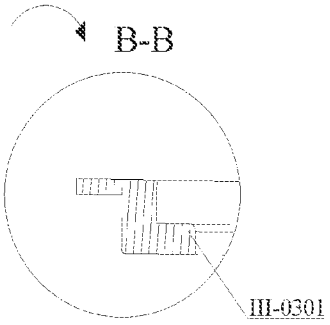
Figure 25A:
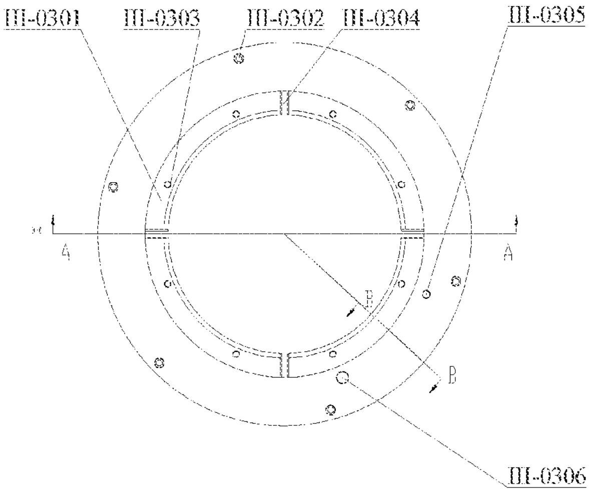
Figure 25B:
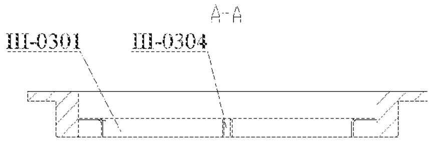

As shown in FIG. 25, FIG. 25(*a*), FIG. 25(*b*) and FIG. 25(*c*), the inner side of the flange thimble III-03 is provided with a flange thimble internal lug boss III-0301 in the circumferential direction, slurry bucket positioning grooves III-0304 are symmetrically disposed in longitudinal and horizontal symmetrical surfaces of the flange thimble internal lug boss, and the upper surface of the flange thimble internal lug boss is evenly provided with six flange thimble internal threaded counterbores III-0303 in the circumferential direction. The upper surface of the flange thimble III-03 is evenly provided with six flange thimble countersunk through holes III-0302 along the circumferential outer edge, and an oil injection joint threaded connecting hole III-0305 and an oil bath box temperature thermocouple threaded connecting hole III-0306 are also disposed on the flange thimble.

Figure 26:
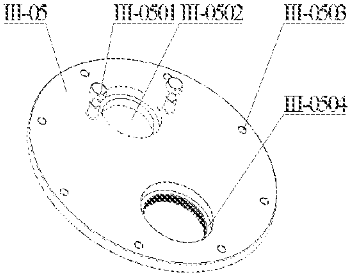
FIG. 26 is an axonometric view of a machine plate.
Figure 26A:
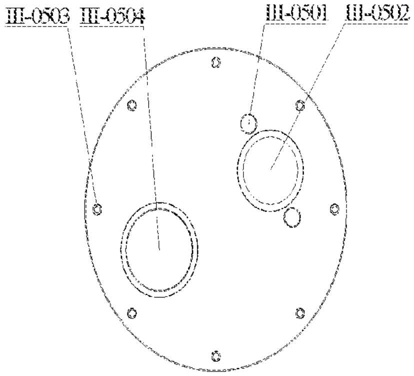
Figure 26B:
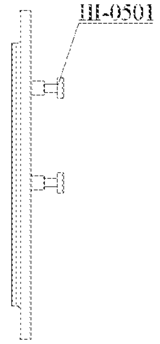

As shown in FIG. 26, FIG. 26(*a*) and FIG. 26(*b*), the upper surface of the machine plate is evenly provided with eight machine plate countersunk through holes III-0503 along the circumferential outer edge, a hand hole III-0502 and a slurry outlet III-0504 are symmetrically disposed along a symmetrical surface, and two hand hole end cover fastening convex heads III-0501 are symmetrically disposed on both sides of the hand hole III-0502.

Figure 27:
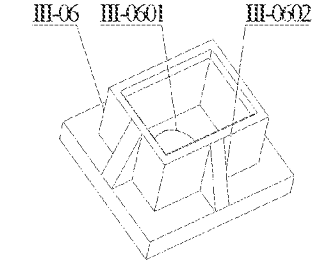
FIG. 27 is an axonometric view of a mold nest.
Figure 27A:
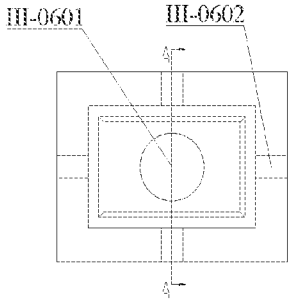
Figure 27B:
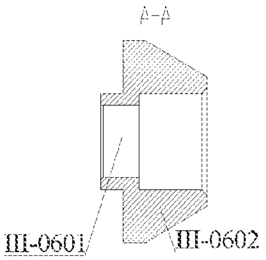

As shown in FIG. 27, FIG. 27(*a*) and FIG. 27(*b*), a mold nest grouting port III-0601 is disposed at the bottom of the mold nest III-06, and four mold nest side reinforcing ribs III-0602 are evenly disposed around the side surfaces of the mold nest III-06.

Figure 28:
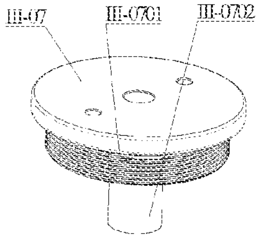
FIG. 28 is an axonometric view of a slurry outlet end cover.
Figure 28A:
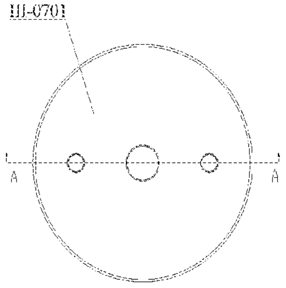
Figure 28B:
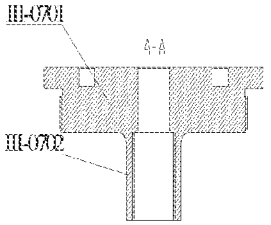

As shown in FIG. 28, FIG. 28(*a*) and FIG. 28(*b*), the slurry outlet end cover III-07 is composed of a slurry outlet end cover threaded connecting lug boss III-0701 and a grouting pipe threaded connector III-0702. The external surface of the lower lug boss of the slurry outlet end cover threaded connecting lug boss III-0701 is provided with threads, and the internal surface of the grouting pipe threaded connector III-0702 is provided with internal threads.

Figure 29:
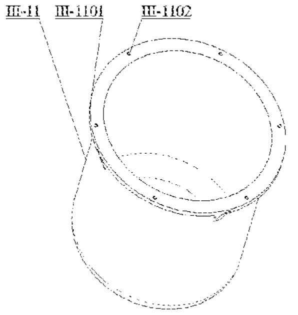
FIG. 29 is an axonometric view of an oil bath box.
Figure 29A:
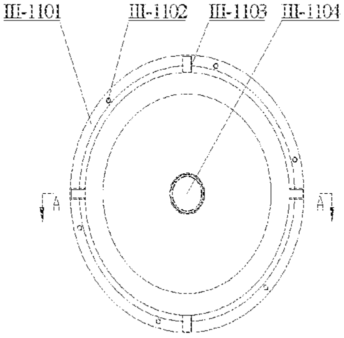
Figure 29B:
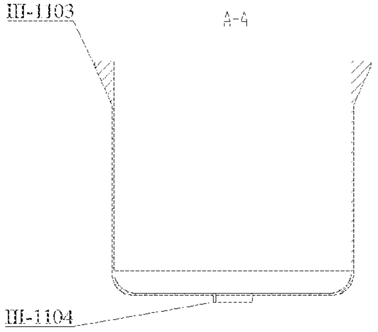

As shown in FIG. 29, FIG. 29(*a*) and FIG. 29(*b*), the bucket opening of the oil bath box III-11 is provided with an oil bath box support lug ring III-1101 in the circumferential direction, six oil bath box positioning through holes III-1102 are evenly disposed on the oil bath box support lug ring in the circumferential direction, the junction of the oil bath box support lug ring and the external surface of a bucket body is evenly provided with four oil bath box lug ring reinforcing ribs III-1103, and an oil outlet III-1104 is disposed at the bottom of the bucket body.

Figure 30:
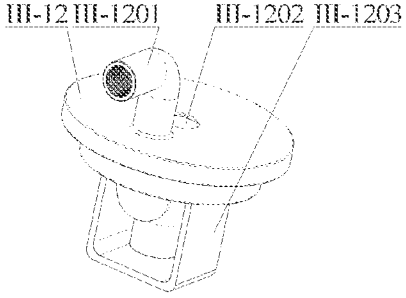
FIG. 30 is an axonometric view of a hand hole end cover.
Figure 30A:
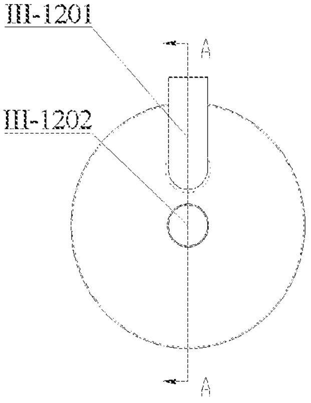
Figure 30B:
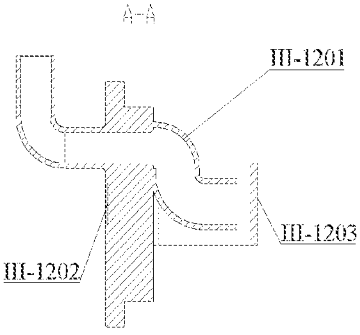

As shown in FIG. 30, FIG. 30(*a*) and FIG. 30(*b*), the upper surface of the hand hole end cover III-12 is eccentrically provided with a hand hole end cover air tap joint III-1201, the center of a circle of the hand hole end cover is provided with a hand hole end cover threaded indenter positioning counterbore III-1202, and a spoiler plate III-1203 is disposed below an air outlet of the hand hole end cover III-12, so as to prevent high-speed airflow from affecting the surface of the slurry.

Figure 31:
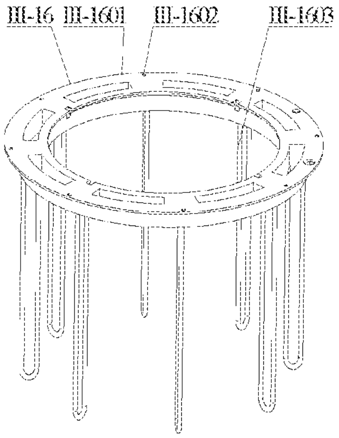
FIG. 31 is an axonometric view of an electric heating device.
Figure 31A:
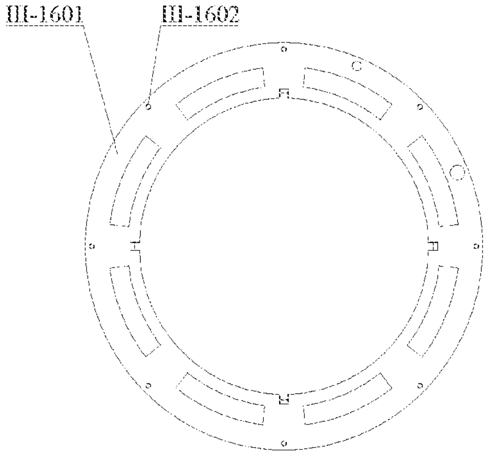

As shown in FIG. 31 and FIG. 31(*a*), the electric heating device III-16 is composed of an electric heating pipe holder III-1601 and electric heating pipes III-1603. The upper surfaces of the electric heating pipes are evenly provided with eight electric heating device positioning through holes III-1602 in the circumferential direction, and in order to reduce the weight, a hollow design is adopted. The electric heating pipes III-1603 are composed of eight sets of U-shaped electric heaters in parallel, and the short circuit in any set will not have a significant impact on the temperature field of the oil bath box. This distribution has the characteristics of high heating efficiency, fast temperature rise and low failure rate.

Figure 32:
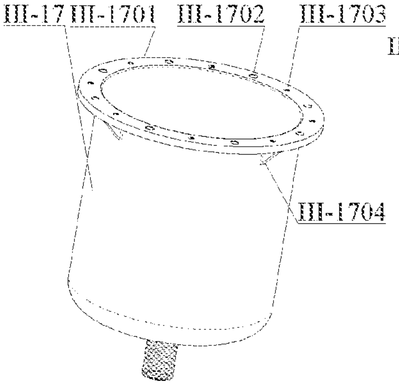
FIG. 32 is an axonometric view of a slurry bucket.
Figure 32A:
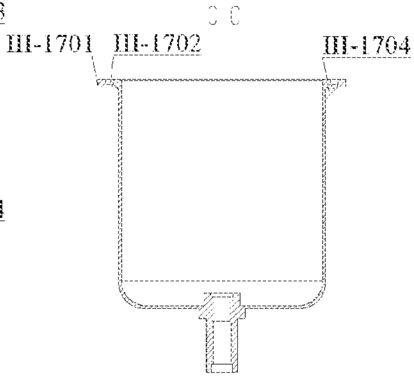
Figure 32B:
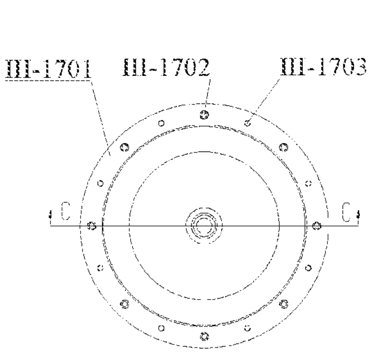

As shown in FIG. 32, FIG. 32(*a*) and FIG. 32(*b*), the bucket opening of the slurry bucket III-17 is provided with a slurry bucket support lug ring III-1701 in the circumferential direction. The upper surface of the slurry bucket support lug ring III-1701 is evenly provided with eight sets of slurry bucket countersunk through holes III-1702 and slurry bucket internal threaded counterbores III-1703 in the circumferential direction. The junction of the slurry bucket support lug ring III-1701 and the external surface of the bucket body of the slurry bucket III-17 is evenly provided with four sets of slurry bucket lug ring reinforcing ribs III-1704 in the circumferential direction.

Figure 33:
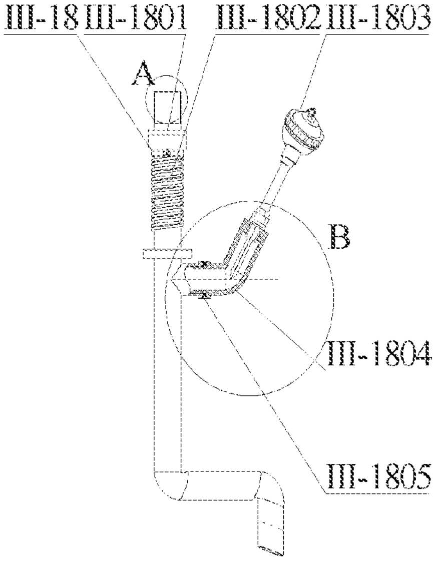
FIG. 33 is a front view of a grouting pipe.
Figure 33A:
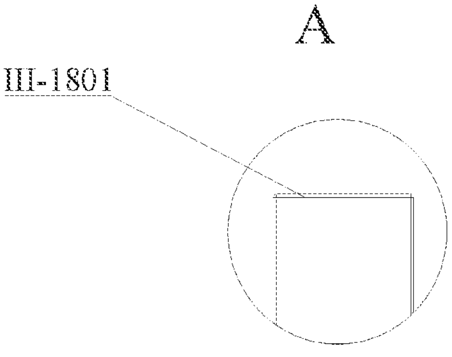
Figure 33B:
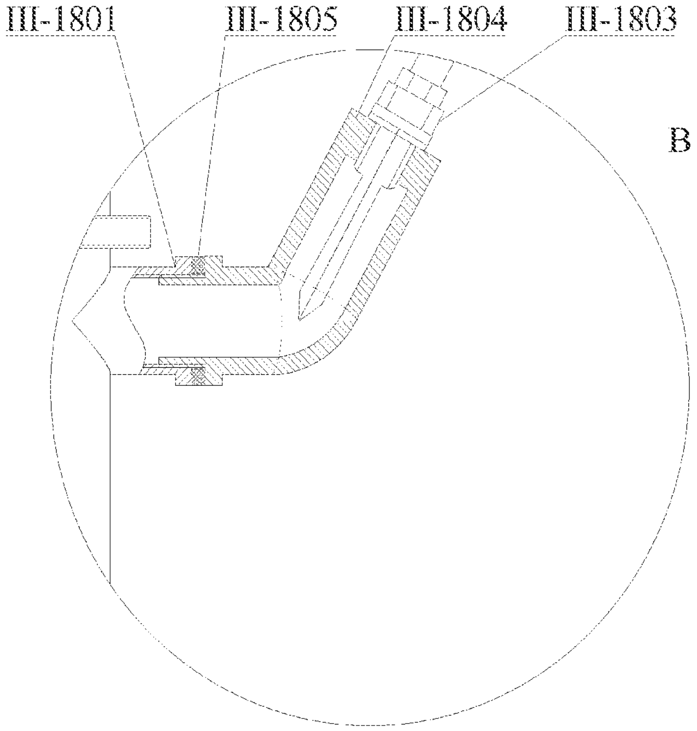

As shown in FIG. 33, FIG. 33(*a*) and FIG. 33(*b*), the grouting pipe is composed of five parts: a first grouting pipe III-1801, a slurry outlet electric heating device III-1802, a thermocouple III-1803, a second grouting pipe III-1804 and an O-shaped sealing ring III-1805. The junction of the first grouting pipe III-1801 and the slurry outlet end cover III-07 is provided with external threads. The slurry outlet electric heating device III-1802 is disposed below the first grouting pipe. The junction of the first grouting pipe III-1801 and the second grouting pipe III-1804 is provided with internal threads. The second grouting pipe III-1804 is in threaded connection with the first grouting pipe III-1801. The joint of the second grouting pipe and the first grouting pipe is provided with the O-shaped sealing ring III-1805. The thermocouple III-1803 is in threaded connection with the second grouting pipe III-1804. The heat transmission mode of the slurry outlet electric heating device III-1802 is mainly thermal conduction.

There are three heat transmission modes: thermal convection, thermal conduction and thermal radiation. In the present disclosure, assuming that the slurry outlet electric heating device III-1802 works in a vacuum environment, so only thermal conduction and thermal radiation are involved. The main theory of thermal conduction is Fourier law:

$$q(x,y,z,t) = -ik\frac{\partial T}{\partial x} - jk\frac{\partial T}{\partial y} - kk\frac{\partial T}{\partial z} \quad (3)$$

$$\nabla T(r,t) + \frac{1}{k}g(r,t) = \frac{1}{\alpha}\frac{\partial T(r,t)}{\partial t} \quad (4)$$

wherein g is a calorific value per unit volume and unit time, k is a thermal conductivity coefficient, $$\alpha = \frac{\rho}{Cp}$$

is a thermal diffusion coefficient, and the thermal conduction belongs to linear calculation with a small calculation error.

Figure 34:
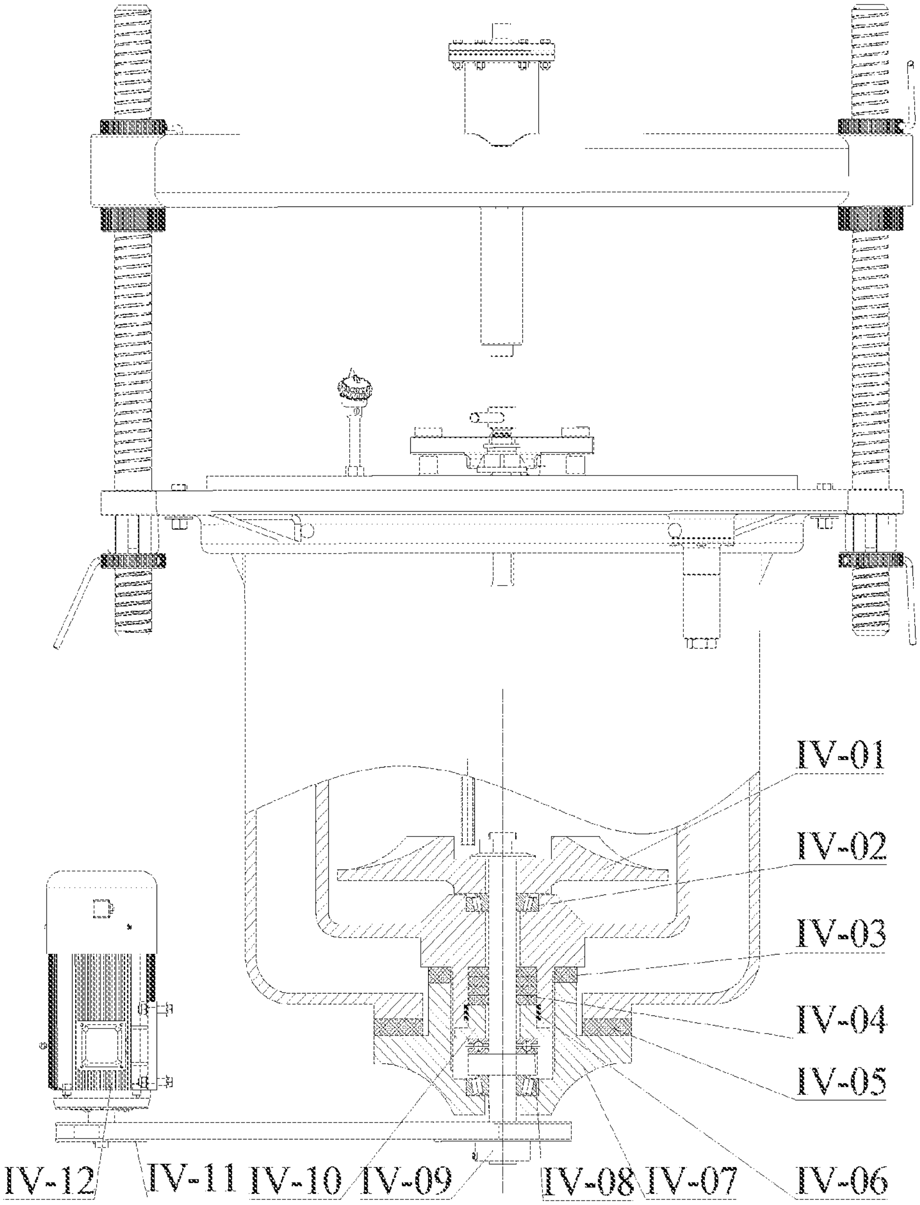
FIG. 34 is a partial cross-sectional view of a stirring device.
Figure 34A:
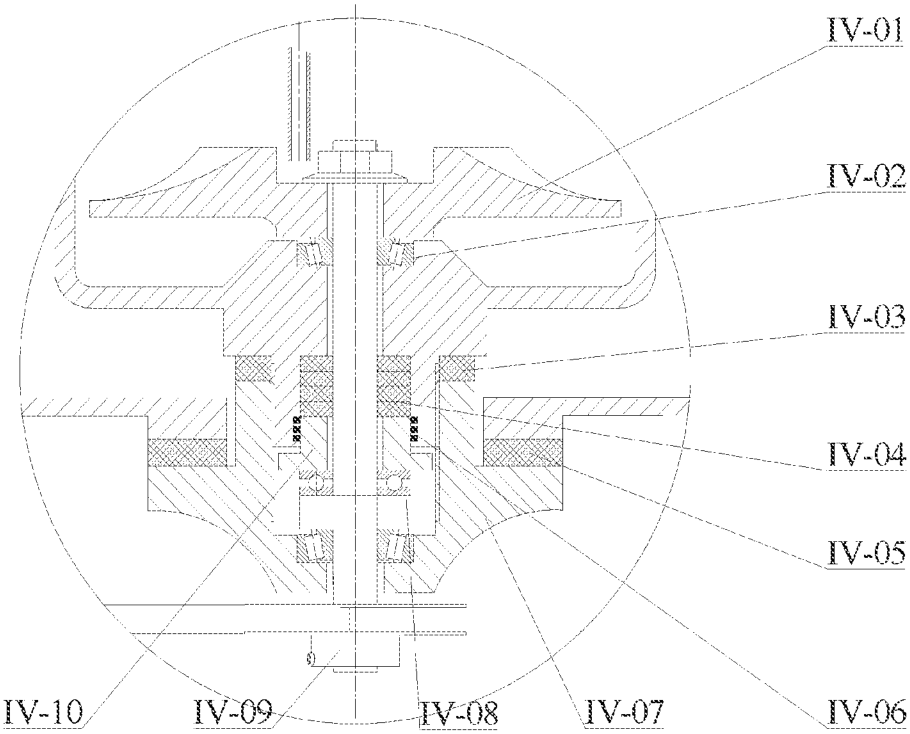

As shown in FIG. 34 and FIG. 34(*a*), the upper end of the transmission shaft IV-09 is provided with external threads. Through the combined action of the nut at the upper end of the transmission shaft IV-09 and the gland IV-07, the bottom surface of the impeller IV-01 and a tapered roller bearing IV-02 are closely fit. The center of a circle of the upper surface of the impeller IV-01 is provided with a counterbore, and a slurry inlet of the grouting pipe III-18 is located above the counterbore, so that the remaining slurry can be reduced to the utmost extent. A cavity between the slurry bucket III-17 and the transmission shaft IV-09 is filled with four circles of packing IV-04. A pressing sleeve IV-10 is disposed below the packing. Three circles of O-shaped washers IV-06 are disposed between the pressing sleeve IV-10 and the slurry bucket III-17. A thrust ball bearing IV-08 is disposed below the pressing sleeve IV-10. A tapered roller bearing is disposed below the lug boss of the transmission shaft IV-09. Internal threads are disposed inside the gland IV-07. The gland IV-07 is in threaded connection with the slurry bucket III-17. An oil bath box base sealing ring IV-05 is disposed between the gland IV-07 and the oil bath box III-11. A slurry bucket base sealing ring IV-03 is disposed between the gland IV-07 and the slurry bucket III-17. The gland IV-07 and the slurry bucket III-17 are tightened by means of threads, and thus, the cavity between the transmission shaft IV-09 and the slurry bucket III-17 is filled with the packing IV-04 so as to form sealing by virtue of the labyrinth effect of the packing. A driving pulley is disposed at the outer end of a motor IV-11, and the impeller IV-01 can be driven to rotate by means of belt transmission so as to realize the purpose of stirring.

Figure 35:
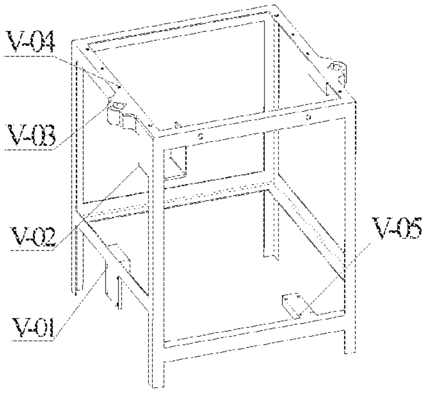
FIG. 35 is an axonometric view of a rack.
Figure 35A:
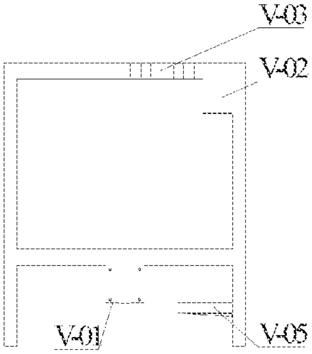
Figure 35B:
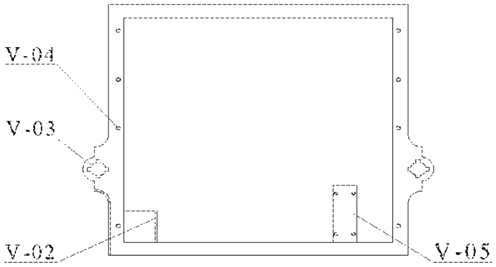

As shown in FIG. 35, FIG. 35(*a*) and FIG. 35(*b*), a motor base V-01 is disposed on the side surfaces of the rack. Four motor positioning through holes are disposed on the motor base. A temperature control box nest V-02 is disposed at the upper left corner of the rack. Threaded support rod bases V-03 are disposed on both sides of the rack. Cross positioning grooves are disposed on the threaded support rod bases. Eight bolt through holes IV-04 are symmetrically disposed on the upper surface of the rack. A pedal base V-05 is disposed on a cross beam at the lower part of the rack. Four bolted connecting holes are disposed on the pedal base.

The specific working processes of this solution are as follows:

First, an assembled mold is placed in the mold nest III-06, the positioning nuts I-10 on the threaded connecting rods I-01 are manually adjusted, the lifting frame I-02 is adjusted to a suitable height to ensure that the indenter of the piston pressing rod I-08 in the piston pressing rod stroke cavity I-0204 is about 3 cm away from the mold, and then, the clamping nuts I-09 are rotated to fix the lifting frame I-02. Subsequently, the motor IV-12 starts to drive the impeller IV-01 inside the slurry bucket III-17 to rotate, so as to achieve a stirring effect on the slurry; simultaneously, the electric heating device III-16 is started through the temperature control box. According to the temperature fed back on the temperature control box by the oil bath box temperature thermocouple III-09 and the temperature requirement of hot casting molding of the slurry inside the slurry bucket III-17, the heating power of the electric heating device III-16 is adjusted and controlled in real time. Then, the pedal on the rack V is stepped on, the air valve is turned on, and high-pressure air is divided into two paths, wherein one path of high-pressure air enters the piston pressing rod stroke cavity I-0204 through the high-pressure air pipe threaded joint I-0402 on the flange surface end cover I-04, so as to push the piston pressing rod I-08 to move downward to tightly press the mold II, and the other path of high-pressure air enters the slurry bucket III-17 through the hand hole end cover air tap joint III-1201 on the hand hole end cover III-12. The slurry flows into the mold cavity through the grouting pipe III-18. According to the blank molding quality and the temperature fed back on the temperature control box by the thermocouple III-1803 on the grouting pipe III-18, the working power of the slurry outlet electric heating device is adjusted and controlled in time. By observing the molding condition of the mold, the pedal is loosened, the air valve is turned off, the piston pressing rod I-08 moves upward under the action of the return spring I-11, the pressure of the slurry bucket III-17 is released, the mold is taken out and disassembled, a pouring gate is cut, and a blank is taken out; after the mold is cleaned, cooled and dried, the mold assembly is completed; and then, the above processes are repeated.

The specific implementations of the present invention are described above with reference to the accompanying drawings, but are not intended to limit the protection scope of the present invention. Those skilled in the art should understand that various modifications or deformations may be made without creative efforts based on the technical solutions of the present invention, and such modifications or deformations shall fall within the protection scope of the present invention.

What is claimed is:

1. An alumina ceramic integrated hot press molding machine, comprising a pressing device and a hot pressing device which are fixed on a rack, wherein the hot pressing device is located below the pressing device, a stirring device is disposed inside the hot pressing device, and a hot pressing mold is disposed above the hot pressing device;

the pressing device enables one path of high-pressure air to act on the hot pressing mold, and enables another path of high-pressure air to enter the hot pressing device, so that a slurry flows into a cavity of the hot pressing mold;

wherein the pressing device comprises threaded connecting rods on both sides of a lifting frame, a piston pressing rod and a return spring disposed in a lifting frame pressing rod stroke cavity, and a flange surface end cover disposed on a lug boss of the lifting frame, the lifting frame is fixed on the threaded connecting rods, a high-pressure air pipe is connected with the flange surface end cover, and high-pressure air is divided into two paths through an air valve and flows out at the same time, wherein one path of air flows to the piston pressing rod stroke cavity on the lifting frame through the high-pressure air pipe, so as to push the piston pressing rod to tightly press the hot pressing mold;

the stirring device is configured to stir the slurry inside the hot pressing device, so that alumina blanks are more evenly distributed in the slurry;

temperature detection components for detecting a temperature of internal oil and a temperature of the slurry at a slurry outlet are respectively disposed inside the hot pressing device, and power of an electric heating device is adjusted and controlled in real time according to the temperatures detected by the temperature detection components, so as to achieve a purpose of accurate temperature control; and the electric heating device and a thermocouple are disposed above a grouting pipe near a position where the slurry outlet is formed, so as to accurately control the temperature of the slurry at the slurry outlet.

2. The alumina ceramic integrated hot press molding machine according to claim 1, wherein a core plate of the hot pressing mold is provided with a core plate positioning column, a core backing plate, an upper mold, a cavity, a lower mold and a slurry inlet plate are positioned and assembled in sequence through the core plate positioning column, and a bottom of the lower mold and an internal junction of a core clamping block and a model cavity have rounded transitions, so that deformation of castings due to stress concentration can be significantly improved.

3. The alumina ceramic integrated hot press molding machine according to claim 1, wherein the hot pressing device comprises an oil bath box and a flange thimble disposed at an upper part of an oil bath box support lug ring, and a slurry bucket and a slurry outlet end cover are disposed on a lug boss on an inner side of the flange thimble in sequence; and a space between the oil bath box and the slurry bucket is filled with oil, a temperature of the oil is accurately controlled through a second electric heating device and a second thermocouple disposed inside, and the grouting pipe is disposed inside the slurry bucket below the slurry outlet end cover.

4. The alumina ceramic integrated hot press molding machine according to claim 1, wherein the stirring device comprises an impeller disposed at a bottom of a slurry bucket, a motor on the rack, and a transmission device; and alumina blanks are distributed more evenly in the slurry through the stirring action of the impeller.

5. The alumina ceramic integrated hot press molding machine according to claim 1, wherein the piston pressing rod inside the pressing device directly faces the center of the slurry outlet, and a height of the piston pressing rod is adjusted through an interaction of positioning nuts and tightening nuts on the threaded connecting rods, so as to be suitable for molds of different heights.

6. The alumina ceramic integrated hot press molding machine according to claim 1, wherein a second electric heating device composed of a plurality of U-shaped heating pipes and a second thermocouple are disposed inside an oil bath box, and a working power of the electric heating device is adjusted and controlled in real time according to a reading on a temperature control box fed back by the second thermocouple.

7. The alumina ceramic integrated hot press molding machine according to claim 1, wherein the thermocouple and the electric heating device are disposed on the grouting pipe inside a slurry bucket, and the working power of the electric heating device is adjusted and controlled in real time according to a reading on a temperature box fed back by the thermocouple on the grouting pipe.

8. The alumina ceramic integrated hot press molding machine according to claim 1, wherein a space between a transmission shaft of the stirring device and a slurry bucket is filled with a packing material, a gland of the stirring device is located at a bottom of an oil bath box, internal threads are disposed inside the gland, the gland is in threaded connection with a convex head of the slurry bucket, and the gland is in clearance fit with an oil outlet of the oil bath box; a pressing sleeve is configured to tightly press the packing material as the gland rotates along external threads of the convex head of the slurry bucket, and thus, leakage of the slurry is avoided by virtue of a labyrinth effect of the packing material; the gland tightly presses rubber sealing rings located on a slurry bucket base and an oil bath box base at the same time, and thus, leakage of the oil is avoided; and furthermore, transmission efficiency of the transmission shaft is higher under the cooperation of multiple sets of bearings.

* * * * *